United States Patent
Dondeti et al.

(10) Patent No.: US 8,281,023 B2
(45) Date of Patent: Oct. 2, 2012

(54) SYSTEMS AND METHODS FOR DATA AUTHORIZATION IN DISTRIBUTED STORAGE NETWORKS

(75) Inventors: Lakshminath R. Dondeti, Hyderabad (IN); Ranjith S. Jayaram, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 12/416,046

(22) Filed: Mar. 31, 2009

(65) Prior Publication Data

US 2010/0125670 A1    May 20, 2010

Related U.S. Application Data

(60) Provisional application No. 61/115,018, filed on Nov. 14, 2008.

(51) Int. Cl.
*G06F 15/16* (2006.01)
(52) U.S. Cl. .................. 709/229; 709/227; 709/228
(58) Field of Classification Search .......... 709/227, 709/228, 229
See application file for complete search history.

(56) References Cited

U.S. PATENT DOCUMENTS

| | | | | |
|---|---|---|---|---|
| 6,741,687 | B1* | 5/2004 | Coppage | 379/114.2 |
| 7,165,152 | B2* | 1/2007 | Blumenau et al. | 711/152 |
| 7,401,132 | B1* | 7/2008 | Krumel et al. | 709/220 |
| 2005/0076339 | A1* | 4/2005 | Merril et al. | 718/104 |
| 2007/0079096 | A1* | 4/2007 | Chen | 711/170 |
| 2007/0226225 | A1* | 9/2007 | Yiu et al. | 707/10 |
| 2007/0288247 | A1* | 12/2007 | Mackay | 705/1 |
| 2008/0098121 | A1 | 4/2008 | Wu | |
| 2008/0115200 | A1* | 5/2008 | Olson et al. | 726/6 |
| 2008/0133445 | A1* | 6/2008 | Pennington | 707/1 |
| 2008/0172341 | A1* | 7/2008 | Crandell | 705/75 |
| 2009/0270064 | A1* | 10/2009 | Kunniyur et al. | 455/404.1 |

FOREIGN PATENT DOCUMENTS

WO    WO 2006/068365    *    6/2006

OTHER PUBLICATIONS

International Search Report and Written Opinion—PCT/US2009/064301, International Search Authority—European Patent Office—Sep. 27, 2010.

(Continued)

*Primary Examiner* — Peter-Anthony Pappas
*Assistant Examiner* — Umar Cheema
(74) *Attorney, Agent, or Firm* — Won Tae Kim

(57) ABSTRACT

Storage authorization and access control of data stored on a peer-to-peer overlay network is provided. A publishing node stores data on a storage node in the overlay network. The publishing node is adapted to facilitate data storage authorization by generating a resource identifier as a function of a usage string associated with a data type to be stored. A storage request is generated that includes the resource identifier and data to be stored. The storage request may be sent to the storage node. The storage device receives the storage request sent by a publishing node, including a resource identifier and data to be stored. Independent storage authorization is performed by the storage node at an overlay level by verifying the resource identifier. The data in the storage request is stored at the storage node if the resource identifier is successfully verified.

42 Claims, 18 Drawing Sheets

*STORAGE NODE*

OTHER PUBLICATIONS

Jennings Cisco B Lowekamp Sipeerior Technologies E Rescorla Network Resonance S Baset H Schulzrinne Columbia University C: "REsource Location and Discovery (RELOAD); draft-ietf-p2psip-reload-00.tx" Resource Location and Discovery (RELOAD); Draft-IETF-P2PS, (Jul. 11, 2008).

Narayanan Qualcomm V., et al., "Usage Agnostic Overlay Operation in RELOAD; draft-vidya-p2psip-usageagnostic- reload-00.txt" Usage Agnostic Overlay Operation in Reload; Draft-Vidya-P2PSIP-Usageagnostic- RELOAD-00.TXT, Internet Engineering Task Force, IETF. Dated: (Nov. 19, 2008).

* cited by examiner

*PUBLISHING NODE - RESOURCE ID GENERATION FOR USAGE LEVEL DATA AUTHORIZATION IN AN OVERLAY NETWORK*

STORAGE NODE – VERIFICATOIN OF RESOURCE ID FOR USAGE LEVEL DATA STORAGE AUTHORIZATION IN AN OVERLAY NETWORK

SYSTEMS AND METHODS FOR DATA AUTHORIZATION IN DISTRIBUTED STORAGE NETWORKS

The present Application for Patent claims priority to U.S. Provisional Application No. 61/115,018 entitled "Systems and Methods For Data Authorization in Distributed Systems", filed Nov. 14, 2008, and assigned to the assignee hereof and hereby expressly incorporated by reference herein.

BACKGROUND

1. Field

Various features pertain to distributed communication and/or storage systems. At least one aspect pertains to methods for authorizing storage in a peer-to-peer overlay network.

2. Background

Structured peer-to-peer networks, such as overlay networks, typically use Distributed Hash Tables (DHT) for scalability and deterministic routing of queries. Distributed hash tables (DHTs) are a class of decentralized distributed systems that provide a lookup service similar to a hash table: (node name, identifier value) pairs are stored in the DHT, and any participating node can efficiently retrieve the identifier value associated with a given node name. Each node has a unique identity in the DHT and likewise each service or object stored in the network has a unique identity. All the identities are part of the same identifier space, which is usually very large to avoid collisions. Responsibility for maintaining the identities (e.g., mapping from node names to identifier values ID) is distributed among the nodes, in such a way that a change in the set of participating nodes causes a minimal amount of disruption. This allows DHTs to scale to extremely large numbers of nodes and to handle continual node arrivals, departures, and failures. DHTs form an infrastructure that can be used to build more complex services, such as distributed file systems, peer-to-peer file sharing and content distribution systems, cooperative web caching, multicast, anycast, domain name services, and instant messaging.

In such distributed systems, especially those implementing distributed hash tables to store and retrieve data and publish and subscribe to service instances, there may not be any control to which entity may publish at which location. Therefore, a mechanism is needed whereby a node's identity by itself or in combination with a service identity may be used to determine where a node may store data.

In such systems it may be challenging to allow the storing node to verify that the data owner is in fact authorized to store at that particular node or resource ID. If an overlay network cannot restrict the number of locations at which data can be stored by a given node, a single harmful node, whether malicious or accidental, could have a negative impact on the distributed quota available in the overlay network. However, restricting the location of storage corresponding to a node to exactly one may also be a problem. Without this, a given node may be burdened by large amounts of data to be stored from a heavy user, which would also provide an attacker incentive to target a particular resource ID for a chosen location attack.

It would be valuable to provide a way to allow the data owner to control which nodes/users are allowed to write, modify, or delete a particular resource ID. Without this, any node may potentially overwrite the contents of a given resource ID.

SUMMARY

Various features herein pertain to storage authorization and access control for data stored on a peer-to-peer overlay network is provided.

According to one feature, a method for storing data on an overlay network is provided and may be implemented, for example, on a publishing node, a processor, and/or may be stored in a computer-readable medium. A resource identifier may be generated as a function of a combination of a first string and a second string, where the first string is independently authenticatable by a storage node and the resource identifier is verifiable by the storage node. In one example, the first string may be a publishing node identifier and the second string may be an arbitrary string. In another example, the first string may be a publishing node identifier and the second string may be a pre-defined string for a service within the overlay network. A storage request may be generated including the resource identifier, data to be stored, an indicator of the first string and/or an indicator of the second string. The storage request may then be sent over an overlay network to be stored at the storage node, where the storage node is responsible for an identifier space including the resource identifier. Due to the construction of the resource identifier, authorization for the storage request may be verifiable at an overlay level of a protocol hierarchy, where the overlay level is below a usage level in the protocol hierarchy.

A plurality of different resource identifiers may be generated as described, where each of the plurality of different resource identifiers is a function of a combination of the first string and different second strings. Because the different resource identifiers are generated using different second strings, this causes data storage load spreading within the overlay network where different storage nodes are responsible for different identifier spaces.

According to another feature, a method for storing data on an overlay network is provided and may be implemented, for example, on a storage node, a processor, and/or may be stored in a computer-readable medium. A first storage request may be received to store data in a peer-to-peer overlay network. The first storage request may include a first resource identifier and a first data to be stored, where the first resource identifier is a function of a combination of a first string that can be authenticated and a second string.

In one example, the first string may be a publishing node identifier and the second string may bean arbitrary string. In another example, the first string may be a publishing node identifier and the second string may be a pre-defined string for a service within the overlay network. Independent storage authorization may be performed at an overlay level of a protocol hierarchy by verifying the first resource identifier. If the first resource identifier is successfully verified, the first data may be stored by the storage node and may be associated with the first resource identifier. In one example, performing independent storage authorization at the overlay level may include (a) authenticating the first string, and/or (b) determining whether the first resource identifier is a function of a combination of the first string and the second string.

A storage node may subsequently receive a data access request for the stored first data. If the data access request proves knowledge of the first resource identifier and the first string, the access to the stored first data may be granted. If the data access request proves knowledge of the first resource identifier but is unable to prove knowledge of the first string, then the storage node may grant read-only access to the stored first data. Granting access to the stored first data may include permitting replacement of the first data with a second data.

According to yet another feature, another method operational on a publishing node for storing data on a peer-to-peer overlay network is provided. A resource identifier may be generated as a function of a second string, where resource identifier is verifiable by a storage node. A storage request may then be generated and includes the resource identifier, data to be stored, and a first string that is independently authenticatable by the storage node. In one example, the first string may be a publishing node identifier and the second string is an arbitrary string. In another example, the first string is a publishing node identifier and the second string is a pre-defined string for a service within the overlay network.

The storage request may be sent over an overlay network to be stored at the storage node, where the storage node is responsible for an identifier space including the resource identifier. Authorization for the storage request may be verifiable at a usage level of a protocol hierarchy using the first string, where the usage level is above an overlay level in the protocol hierarchy. Different publishing nodes within the overlay network may generate data storage requests having the same resource identifier but different first strings. The different data storage requests may be distinguishable based on usage level authorization using the different first strings.

According to yet another feature, another method operational on a storage node for storing data on a peer-to-peer overlay network is provided. A first storage request may be received to store data in a peer-to-peer overlay network. The first storage request may include a first resource identifier, a first data to be stored, and a first publishing node identifier, where the storage node is responsible for an identifier space including the first resource identifier. A second storage request may be received to store data in a peer-to-peer overlay network. The second storage request may include the first resource identifier, a second data to be stored, and a second publishing node identifier. The first data and the first publishing node identifier may be stored by the storage node and may be associated with the first resource identifier. The second data and the second publishing node identifier may be stored by the storage node and associated with the first resource identifier. The storage node may perform independent storage authorization at a usage level of a protocol hierarchy, wherein the usage level is above an overlay level in the protocol hierarchy.

Subsequently, the storage node may receive a data access request for data associated with the first resource identifier. The storage node may grant read-only access to the stored first data and second data. However, if the data access request proves knowledge of the first publishing node identifier, the storage node may grant write access to the stored first data. Likewise, if the data access request proves knowledge of the second publishing node identifier, the storage node may grant write access to the stored second data.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

Figure 1:
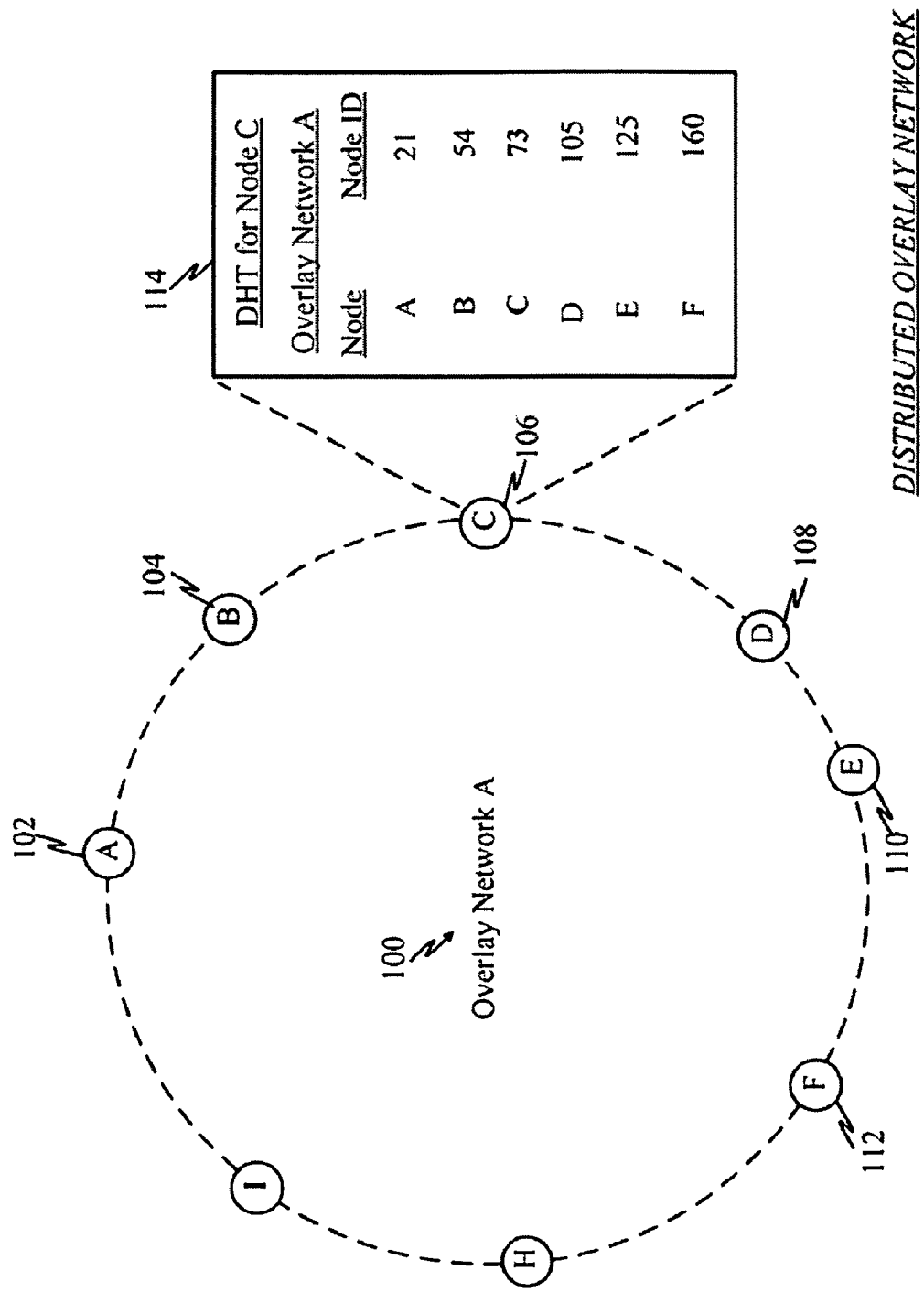
FIG. 1 is a diagram illustrating how a DHT may operate to facilitate the operation of a peer-to-peer overlay network.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

As used herein, the term "node" may refer to any device, computer, processing unit, etc., that is addressable within a network. The terms "identification", "identifier", and "ID" may be interchangeably used to refer to a value (e.g., number or string) that serves to identify a particular node with a network. A "publishing node" may refer to a node that seeks to store information on another node in a network. A "storage node" may refer to a node that stores information for a publishing node in a network. The term "data" (e.g., stored data) may include any type of information such as audio and/or video content, text, images, etc.

Overview

In peer-to-peer overlay networks, stored data or information may be associated with a particular usage (e.g., overlay service, function, or application) that makes such data or information potentially accessible to other nodes in the overlay network. In order to identify and store data in the overlay network, a particular resource identifier (e.g., resource ID) is generated and associated with the data or information. Various features are provided that facilitate data storage authorization in a peer-to-peer overlay network.

According to a first implementation, within a peer-to-peer overlay network comprising a plurality of nodes, a publishing node is permitted to store data or information on a plurality of different storage nodes while still permitting authorization control over such stored data. In this implementation, authorization control for data storage and/or access may be performed at an overlay level of a protocol hierarchy, where the overlay level is below a usage level in the protocol hierarchy. That is, authorization to access, modify and/or delete data stored in a storage node may be implemented while still allowing the data to be spread across multiple node locations in the overlay network. One way to accomplish such authorization is to identify or associate the data to be stored by a resource identifier (resource ID) that is computed as a function of a combination of a first string and a second string, where the first string may be independently authenticatable by a storage node and the resource identifier may be verifiable by the storage node. For example, the first string may be a publishing node identifier and the second string may be arbitrary or a pre-defined string indicative of a usage type. In one instance, the publishing node identifier (and/or the publishing node's public key) may be associated with a private certificate which is used to sign data being stored by the publishing node. This allows the storage node to ascertain whether a node submitting a request to change or modify stored data has knowledge of such private certificate. Because a particular publishing node may use the same first string but different second strings (e.g., for different types of data or usages), different resource IDs will be generated and, consequently, such data will likely be stored at different storage nodes on the peer-to-peer network to achieve data load spreading.

A storage node may determine whether a particular node may modify or delete stored data associated with a particular resource ID. That is, a data access and/or modification request may be allowed only where a requesting node is able to prove knowledge of the resource identifier, the first string (e.g., the publishing node identifier), and/or the private certificate associated with the publishing node. Such authorization may be implemented at an overlay level of a protocol hierarchy, where the overlay level is below a usage level in the protocol hierarchy.

In an alternative implementation, in certain usages it may be desirable to allow nodes to access stored data by searching for certain types of data using resource IDs. However, such searches are impractical when a resource ID is based on both a first string (e.g., associated with the publishing node) and a second string since the searching node may not know the first string (e.g., publishing node identifiers) associated with stored data. Therefore, in an alternative implementation, resource IDs for stored data may be based on just the second string. Such "second" string may be a predetermined, known, and/or knowable string (e.g., by each type of usage, application, or service). Because such string may be predefined by each usage, other nodes searching for data associated with that usage may regenerate the resource ID (e.g., based on the known string) and search for the resource ID in the overlay network. This scheme not allows multiple nodes to search for a particular type of data using just the resource ID but also allows multiple different publishing nodes to store data using the same resource ID. In this implementation, authorization control for data storage and/or access may be performed at a usage level of a protocol hierarchy, where the usage level is below an overlay level in the protocol hierarchy. To distinguish between different instances of stored data that use the same resource ID (e.g., because they may be based on the same string), each instance of stored data may also be associated with a "first" string (e.g., a publishing node's identifier) which may be verified at a usage level. A storage node may also use the "first" string (e.g., publishing node ID) associated with an instance of stored data to ascertain whether a node requesting to modify or delete that instance of stored data has the correct private certificate associated with the publishing node ID.

DHT Overlay Network

An overlay network is a communication or data network which is built on top of another network. Nodes in the overlay can be thought of as being connected by virtual or logical links, each of which corresponds to a path, perhaps through many physical links, in the underlying network. Within a communication network, each network node may have an Internet Protocol (IP) address that is used to route messages to and/or from the node. On top of such network IP layer, it is possible to implement an overlay network that uses a node identifier (i.e., Node ID) for each node. Consequently, even if the IP address for a node was to change, its Node ID remains the same for the overlay network. Thus, the overlay network does not rely on the IP layer infrastructure but instead uses Node IDs for peer-to-peer communications among its nodes. Additionally, such overlay network may implement Distributed Hash Tables (DHT) across its nodes so that the overlay network is not crippled by any single point of failure.

In one example, a P2PSIP overlay network may be an association, collection, and/or federation of nodes that provides SIP registration, SIP message transport, and similar functions using a P2P network. The Session Initiation Protocol (SIP) is a signaling protocol widely used for setting up and tearing down multimedia communication sessions, such as voice and video calls over the Internet and other networks. The SIP protocol has been adapted for peer-to-peer (P2P) networks (i.e., P2PSIP) for resolving the targets of SIP requests, providing SIP message transport, and providing other SIP-related functions.

Figure 2:
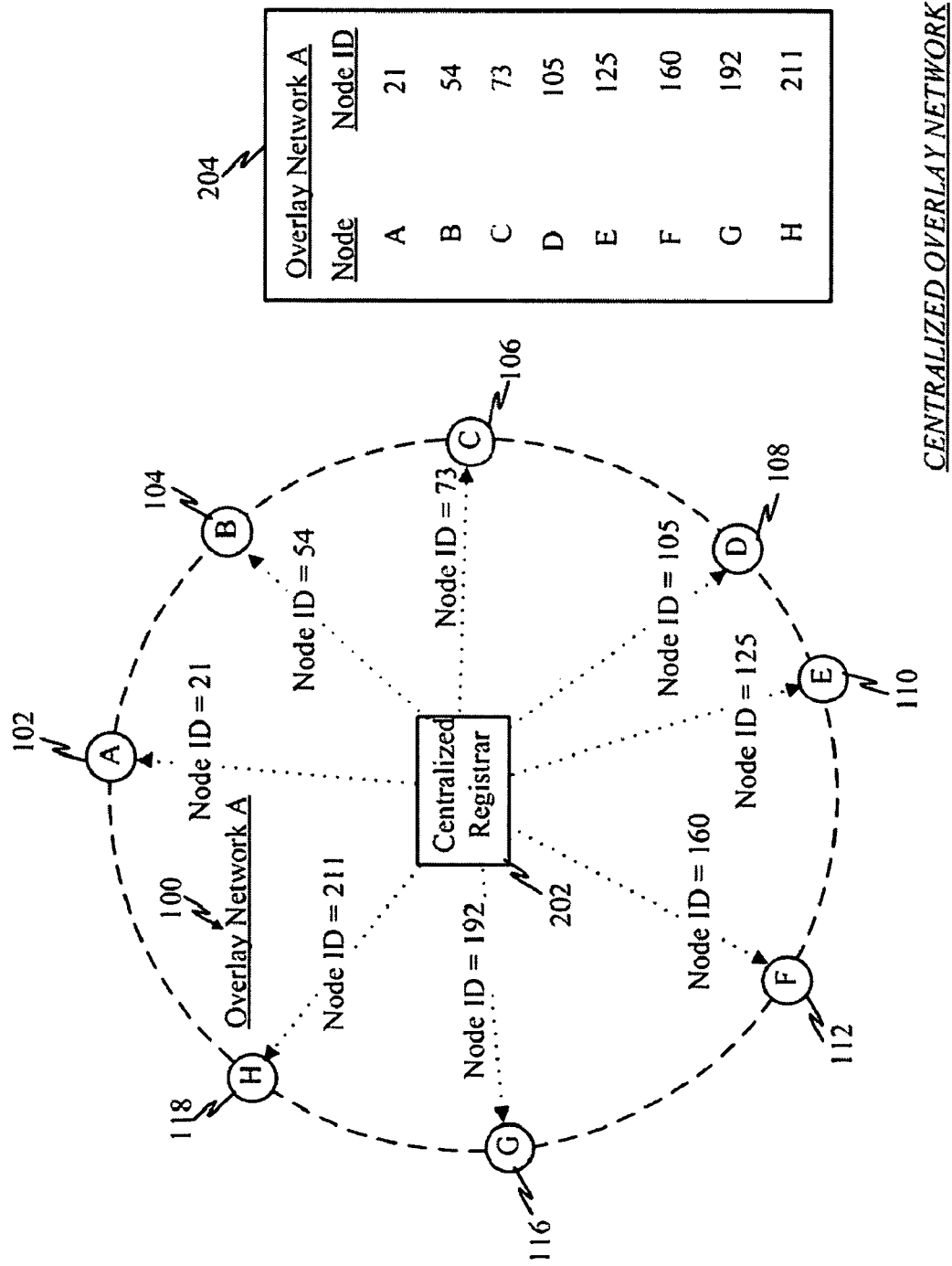
FIG. 2 is a block diagram illustrating how a centralized registrar (trusted authority) may serve to assign node IDs to a plurality of nodes within an overlay network.

Various aspects described herein may be implemented in centralized and/or distributed peer-to-peer overlay network architectures. FIGS. 1 and 2 illustrate examples of distributed and centralized overlay networks, respectively.

FIG. 1 is a diagram illustrating how a DHT may operate to facilitate the operation of a peer-to-peer overlay network. While this example illustrates the overlay network as a ring, this is just for the sake of simplicity and other overlay network architectures are possible and contemplated. A peer-to-peer overlay network A 100 may be formed by a plurality of nodes A 102, B 104, C 106, D 108, E 110, and/or F 112. Each node may maintain a portion of the DHT (e.g., node name, node identifier) for the overlay network A 100. Each node has a unique node identifier (Node ID) in the DHT 114 of overlay network 100, selected from an identifier space. Likewise, each service or object stored in the network 100 may have a unique identifier, also selected from the identifier space. All the Node IDs may be part of the same identifier space, which is usually very large to avoid collisions. Responsibility for maintaining the Node IDs (e.g., mapping from node names to node identifiers) is distributed among the nodes, in such a way that a change in the set of participating nodes causes a minimal amount of disruption. Each node may be responsible for a portion of the identifier space, typically starting from its own Node ID to the Node ID of one or more of its neighbors. The node may be responsible for storing objects and/or responding to queries for objects that map to any location within the range for which it is responsible. Each node may maintain a set of links to other nodes (its neighbors or routing table). Together, these links form the overlay network. A node picks its neighbors according to a certain structure, called the network's topology.

A cryptographic hash function may be used to assign identifiers (IDs) to nodes, objects and instances of services within the overlay network 100. Most DHTs use some variant of consistent hashing to map hash keys (i.e., identifiers) to nodes and/or services. This technique employs a function $\delta(k_1,k_2)$ which defines an abstract notion of the distance from key $k_1$ to key $k_2$, which is unrelated to geographical distance or network latency between nodes. Each node is assigned a single key called its identifier (i.e., Node ID). A node with identifier value (Node ID) i owns (or is responsible for) all the keys (or identifiers) for which identifier i is the closest ID, measured according to $\delta$. DHT network topologies share some variant of the property that for any key k, the node either owns k or has a link to a node that is closer to k in terms of the keyspace distance defined above. It is then relatively simple to route a message to the owner of any key k (i.e., identifier) using a greedy algorithm. For example, at each node, a message is forwarded to the neighboring node whose Node ID is closest to key k. When there is no such neighbor (i.e., no other neighboring node has a closer Node ID), then it is assumed that the message has arrived at the closest node, which is the owner of key k as defined above. This style of routing is sometimes called key-based routing. In one example, DHT may treat keys as points on a circle (as illustrated in FIG. 1), and $\delta(k_1,k_2)$ is the distance traveling clockwise around the circle from $k_1$ to $k_2$. Thus, the circular keyspace is split into contiguous segments whose endpoints are the node identifiers (Node IDs). If $i_1$ and $i_2$ are two adjacent IDs, then the node with ID $i_2$ owns all the keys that fall between $i_1$ and $i_2$. Due to efficiency considerations in implementing this network topology, it may be advisable to guarantee that the maximum number of hops in any route (route length) is low, so that requests complete quickly; and that the maximum number of neighbors of any node (maximum node degree) is low, so that maintenance overhead is not excessive. Note that one tradeoff is that shorter routes require a number of neighbors for each node (i.e., higher maximum node degree).

In one example, node C 106 may maintain a DHT 114 in which it keeps the Node IDs for one or more predecessor nodes and one or more successor nodes. The DTH 114 may only a subset of all Node IDs, i.e., the Node IDs proximate to the Node ID for node C 106. For instance, DHT 114 for Node C 106 may maintain the preceding Node IDs for Nodes A 102 and B 104 and the succeeding Node IDs for Nodes D 108, E 110, and F 112. DHTs can scale to extremely large numbers of nodes (e.g., $2^{16}$ nodes in network 100) and are able to handle continual node arrivals, departures, and failures. In one example, the DHT may treat Node IDs as points on a circle, and $\delta(\text{Node IDi}_1, \text{Node IDi}_2)$ is the distance traveling clockwise around the circle (e.g., from Node C to some Node IDx). Thus, the circular identifier space is split into contiguous segments whose endpoints are the node identifiers (node IDs). If $i_1$ and $i_2$ are two adjacent node IDs, then the node with ID $i_2$ owns all the keys that fall between $i_1$ and $i_2$. Consequently, DHTs can form an infrastructure that can be used to build more complex services (e.g., distributed file systems, peer-to-peer file sharing and content distribution systems, cooperative web caching, multicast, anycast, domain name services, and instant messaging) where each such service may be associated with an identifier in the circular identifier space. The node having a node ID closest in value to a particular service identifier may be assumed to host such service (e.g., store a particular file or provide the service identified by the "service" identifier, etc.). For example, referring to DHT 114, if a service has an identifier value of "79", it is closest to the node ID "73" associated with Node C 106 and therefore, any request for such service would eventually end up at Node C 106.

FIG. 2 is a block diagram illustrating how a centralized registrar (trusted authority) may serve to assign node IDs to a plurality of nodes within an overlay network. For the overlay network 100, a centralized registrar 202 may serve to provide node IDs to the plurality of network nodes 102, 104, 106, 108, 110, 112, 116, and/or 118 to form a DHT 204. Each time a network node seeks to obtain a node ID, it sends a message to the centralized registrar 202 requesting an assignment of a node identifier. The centralized registrar 202 then computes a node ID for the requesting node, assigns it to the requesting node, and sends it to the requesting node.

In some implementations, the centralized registrar 202 may not participate in any overlay network operation and, as such, may not even be reachable for node ID verification by other nodes. One example of such centralized registrar 202 may include a certificate authority (CA) that receives public keys from requesting nodes, assigns node IDs, and asserts the mapping of the node IDs to the nodes. For instance, the CA may sign a mapping of a node ID using a requesting node's public key. The requesting node can then present the certified node ID to other nodes and prove possession of the public key included in the certificate. The node can prove of this possession by signing certain transmitted contents with its private key. Other nodes can verify the resultant signed content using the public key certified by the node's certificate. An overlay network specific centralized registrar may be deployed by creators of a given overlay network or entities interested in promoting the adoption of such overlay networks or it may also be provided by network operators.

One weakness in using a centralized registrar is that it may be difficult for all potential members (e.g., nodes) of a peer-to-peer overlay network to trust a single authority that owns and operates the centralized registrar. In some implementations, rather than the overlay network nodes relying completely on an external authority (i.e., centralized registrar) for node ID assignments, the centralized registrar 202 may instead provide a random input to the hash function with the node itself providing another random input to the hash function. Each of these two inputs would be used by a verifier node in verifying that a node ID belongs to the node that claims it.

Centralized registrars may restrict the number of node IDs that a single entity or node can obtain. For instance, in the case of an operator-owned centralized registrar, node IDs may be tied to service subscriptions.

Figure 3:
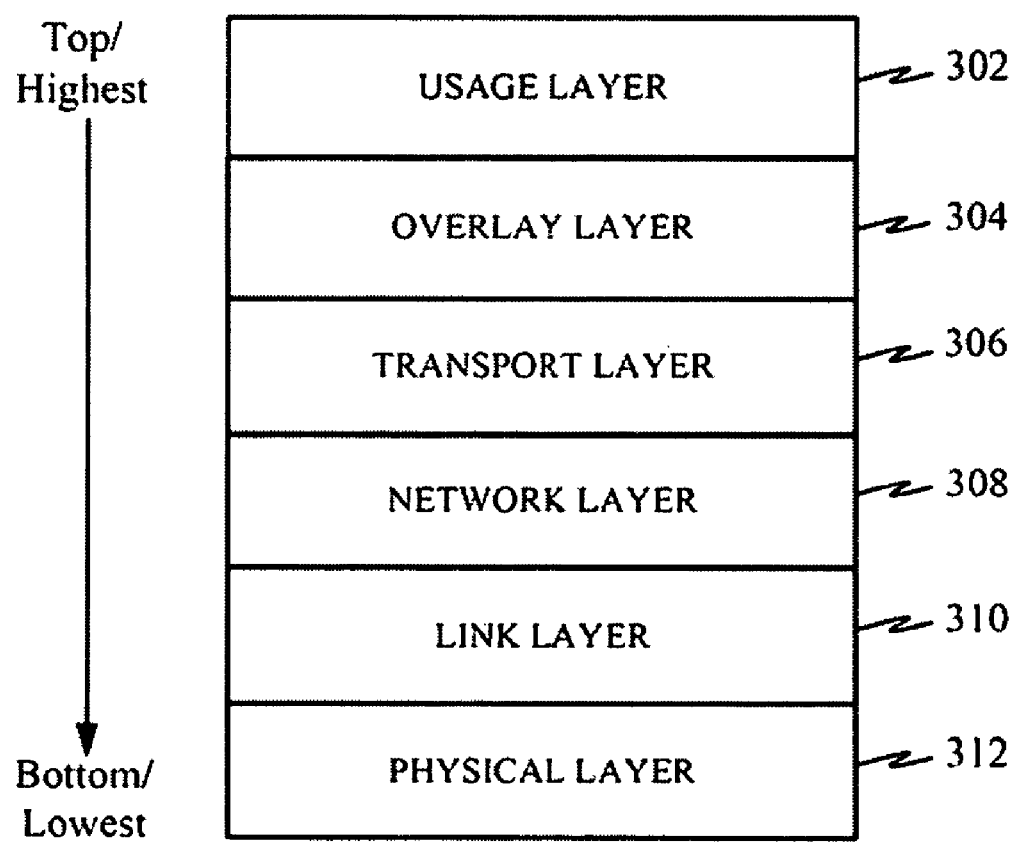
FIG. 3 is a block diagram illustrating one example of a protocol hierarchy which may be implemented within a network.

FIG. 3 is a block diagram illustrating one example of a protocol hierarchy which may be implemented within a network. In this example, the overlay network may be built on a protocol stack that includes a transport layer 306, a network layer 308, a link layer 310, and/or a physical layer 312. On top of these base layers, an overlay layer 304 may be implemented, which may include P2P and/or SIP protocols. On top of the overlay layer 304, a usage layer 302 may be built through which services are supported. The usage layer 302 may also be referred as an application layer or a data layer. The "layers" may also be referred to as "levels". Note that other contemplated implementations may include other or equivalent layers and/or may omit some layers. In some sense, the usage layer 302 may be considered a top layer or highest layer relative to the other layers 304-312. Likewise, the physical layer 312 may be considered a bottom layer or lowest layer relative other layers 302-310.

The nature of peer-to-peer computing is that each peer offers services to other peers to allow the overlay to collectively provide larger functions. In P2PSIP, peer nodes offer storage and transport services to allow a distributed database function and a distributed transport function to be implemented. It is conceivable that individual peers may also offer other services. Some of these additional services (e.g., a Simple Traversal of UDP through NATs (STUN) server service) may be required to allow the overlay network to form and operate, while others (for example, a voicemail service) may be enhancements to the basic P2PSIP functionality. The nodes of the overlay network, may need to store information about which peer nodes offer which services, and perhaps what sort of capacity each peer node has for delivering each listed service.

The nodes illustrated in FIGS. 1 and 2 may implement authenticated data storage. For instance, a publishing node A 102 may generate a resource ID and associates it with data to be stored. The resource ID may map, for example, to node F 112 which serves as the storage node. The various features described here may be implemented in the overlay networks of FIGS. 1 and 2 as well as other types of overlay networks.

Data Storage and Authorization in Distributed P2P Networks

An example of a peer-to-peer (P2P) overlay network is P2PSIP (Session Initiation Protocol), which is being standardized by the IETF (The Internet Engineering Task Force). Various data storage authorization features described herein may be implemented in a P2PSIP-compliant network. As part of P2PSIP, resource allocation may be considered which may allow usages to be defined on top of an overlay instantiation. Usages may define various kinds of data, with a corresponding data model for each kind. In order to store data on a particular node in the overlay, the type or kind of data being stored may be identified and the resource ID may be computed using a certified user name or node ID, where the certificate of interest and resource ID calculation mechanism may be defined by a usage.

For these reasons, it may be necessary that all nodes in an overlay network support all usages that may be offered on that overlay network. Further, when usages evolve to newer versions, it may be necessary that all nodes support the same versions of all usages. In a distributed network (e.g., where no centralized node authority is available), this may require a "n day" in which to update all nodes. However, having an update day is cumbersome and usually unrealistic for practical network implementations.

Consequently, there is a need for keeping storage and overlay-level data authorization usage agnostic (e.g., independent of particular usages, data types, etc.). By doing so, overlay networks can support heterogeneous usages as well as allow upgrades to evolve over time. Consequently, properties and primitive functions provided at the overlay layer may be maintained or kept independent of the usage layer. In one example, the term "overlay layer" (or overlay level) may be used to refer to operations at the layers below the usage layer and above the transport layer in a protocol hierarchy. The terms "application layer" and/or "usage layer" may be used to refer to operations at the usage layer of the protocol hierarchy.

Figure 4:
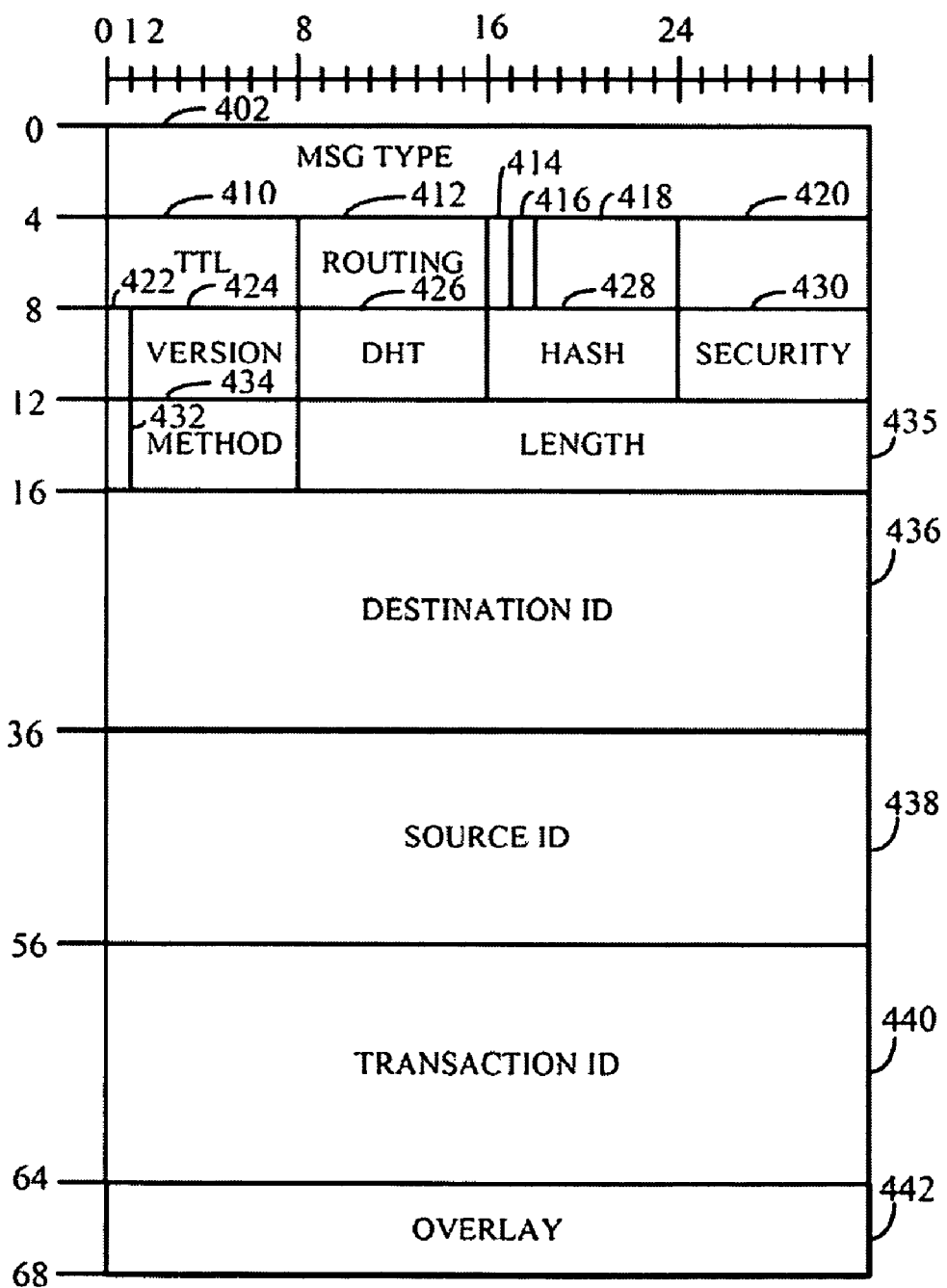
FIG. 4 is a diagram illustrating an example of a message header architecture that may be employed in one example for data storage requests in an overlay network.

FIG. 4 is a diagram illustrating an example of a message header architecture that may be employed in one example for data storage requests in an overlay network. However, other types of message headers may be used. The body of the message (not shown) may follow the message header architecture. The architecture is shown in four-byte-rows, since many of the structures are multiples of four bytes in length. Bytes are the major hash marks on the horizontal axis. Bits are the minor hash marks on the horizontal access. The starting byte (counting from zero) for each message or row is shown on the vertical access. The first four bytes 402 (zeroth through third byte) may be used to identify the message type or kind.

The fourth byte 410 is a time-to-live (TTL) field indicating the number of iterations, or hops, a message can experience before it is discarded. The TTL field is decremented each hop, and a message should not be forwarded any more hops if the TTL is zero.

The fifth byte 412 is routing and indicates the type of routing to be followed. Routing may be proxy or redirect, for example. The FRAG field 414 is a one bit field in the sixth byte 418 used to indicate whether the message is a fragment. The LFRG field 416 is a one bit field in the sixth byte used to specify whether this is the last fragment in a complete message. Fourteen bits (six bits from the sixth byte 418, plus all eight bits of the seventh byte 420) are reserved for indicating the fragment offset and total length.

The EXP field 422 is a one bit field that specifies whether the protocol being used is experimental or not. The version field 424 is a seven bit field that indicates the version of the P2PSIP protocol being used. The DHT field 426 is an 8 bit field that specifics the DHT algorithm being used. The Chord DHT algorithm may be used. Other DHT algorithms are possible.

The hash field 428 is an 8 bit field that specifies the hash algorithm being used to generate IDs. All IDs used for an overlay should or must be calculated using the same algorithm. An example algorithm is the SHA-1 algorithm, which produces a 160 bit hash value, though other hash algorithms may be used. Security 430 is an 8 bit field that indicates the security mechanism being used by participants in the overlay.

The R/r bit 432 is a one bit field used to specify if this is a request or a response. The method field 434 is a seven bit field that indicates the message method. There are at least four method types: peer, resource, transport and DHT specific. The method type is specified by the first two bits of method 434. The remaining five bits are used to specify the specific method. Example methods are "peer-join", "peer-search", "resource-get", "resource-put", "resource-transfer", "transport-open" and "transport-tunnel". Note that the term "peer" may refer to a node in an overlay network.

The length field 435 is the count in bytes of the size of the message, not including the header. The destination ID field 436 is a 160 bit identifier (e.g., node ID or resource ID) that uniquely identifies the destination node or resource. The source ID field 438 is a 160 bit identifier (e.g., node ID or resource ID) that uniquely identifies the sender.

The transaction ID field 440 is a unique 64 bit number that identifies the transaction and also serves as a salt or seed to randomize the request and the response. Responses may use the same transaction ID as the request to which they correspond. The overlay ID field 442 is a 32 bit checksum or hash of the overlay being used. The checksum must or should be used to convert the variable length string representing the overlay name into a 32 bit value. The 32 bit overlay field provides an integrity check. It may provide a digital signature representing the overlay name so that nodes can verify that they are interacting with the intended overlay network.

Agnostic Overlay Behavior

At a very fundamental level, DHTs provide key-based routing on top of which several applications may exist. Overlay protocols often provide storage and retrieval semantics and allow peer-to-peer connectivity for nodes. These are very basic primitives that can be used by a wide range of applications. Even for the SIP-based class of applications within the scope of the P2PSIP working group, there are several applications that may exist on various nodes in an overlay. It is not necessary that all nodes in an overlay support the same applications. Further, a given application may evolve over time, with newer versions potentially defining new kinds of data to be stored and retrieved on an overlay.

Overlay primitives, such as storage functioning independent of the usage, are advantageous in that they do not require all nodes in the overlay network to support a given usage in order to store data corresponding to that usage. Usages may, of course, provide additional mechanisms at the usage level that may be interpreted by nodes that do support those usages, but this is independent of the overlay primitives.

Given the heterogeneous usages and potential evolution of even the same usage, an overlay network may need a flag day (or synchronization period) for upgrading all nodes, if the operations on the overlay primitives are allowed to be defined by the usages. The overlay will then be rendered unusable or will result in unpredictable behavior when incompatible usages are present on various nodes. Hence, while usages should be allowed to interface with the overlay layer to provide certain inputs, the operations on overlay primitives such as storage should be defined and contained within the overlay layers.

Example—Top Level Data Authorization Scheme

According to a first example of data authorization in a peer-to-peer overlay network, a resource identifier may be generated based on a combination of a first string and a second string, where the first string is independently authenticatable by a storage node and the resource identifier is verifiable by the storage node. For example, the first string may be a publishing node ID or its equivalent. The second string may be an arbitrary string or a pre-defined string. The publishing node may generate a storage request including the resource identifier and data to be stored. The storage request may be sent over the overlay network to be stored at the storage node, where the storage node is responsible for an identifier space including the resource identifier. The storage node may perform independent storage authorization at an overlay level of a protocol hierarchy by verifying the resource identifier.

Figure 5:
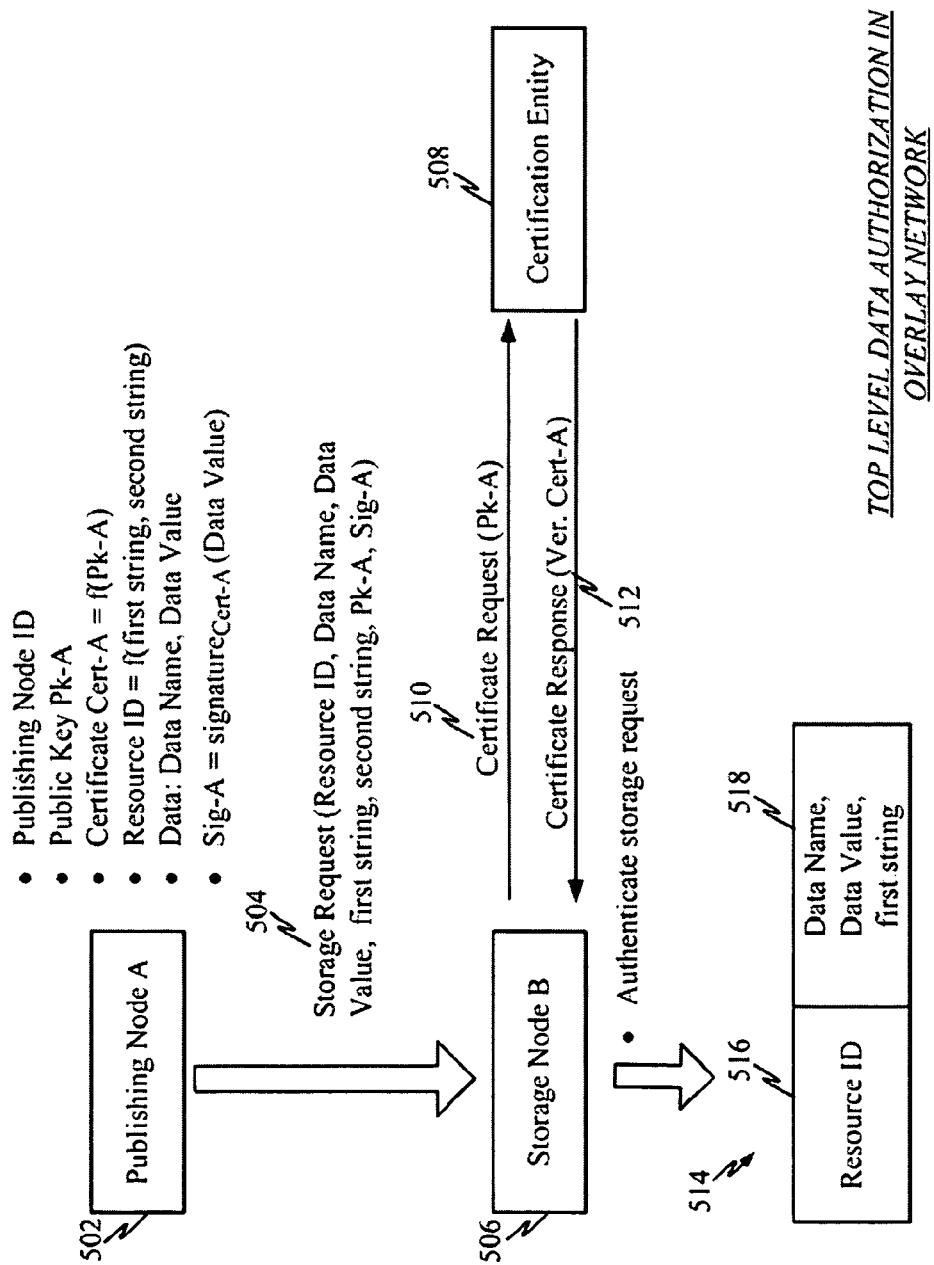
FIG. 5 is a block diagram illustrating an example of how distributive data storage and authorization may be performed in a peer-to-peer overlay network.

FIG. 5 is a block diagram illustrating an example of how distributive data storage and authorization may be performed in a peer-to-peer overlay network. A publishing node A 502 may seek to store data (i.e., Data Value) which may be identified by a Data Name in an overlay network. The publishing node A 502 may have a Publishing Node ID and a Public Key Pk-A (with a corresponding Private Key Prv-A). A Certificate Cert-A may be obtained by the publishing Node A 502 from a certification entity 508, where the Certificate Cert-A is a function of its Public Key Pk-A.

When the publishing node A 502 wishes to store the data in the overlay network, it may generate an associated Resource ID as a function of a first string and a second string. In one example, the first string may be the Publishing Node ID. The second string may be a predetermined string (e.g., describing the data, usage, or data type) or may be an arbitrary string. Where the second string is a predetermined string, it may be part of a hierarchical structure or may be a concatenation of string components. In various examples, each of the first and/or second strings may be an alpha, alpha-numeric, and/or numeric sequence of symbols. The publishing node A 502 may also generate a signature Sig-A as a function of Cert-A and the data to be stored (e.g., by signing Data Value with Cert-A).

A storage request 504 may then be generated and sent by the publishing node A 502. The storage request 504 may include the Resource ID, Data Name, Data Value, the first string, the second string, public key Pk-A, and signature Sig-A.

In this example, the Resource ID may map to a resource space for which node B 506 is responsible. Upon receipt of the storage request 504, storage node B 506 may authenticate the requesting node is in fact the publishing node A 502. In one example, this authentication may be accomplished by sending a Certificate Request 510 to the certification entity 508, which may include the public key Pk-A. In response, the storage node B 506 may receive a Certificate Response 512 with a verification certificate Ver. Cert-A which is a function of the public key Pk-A. If the received signature Sig-A matches a locally generated signature of the received Data Value signed with Ver. Cert-A, then the storage node B 506 has successfully verified the authenticity of the storage request 504. Otherwise, if the received signature Sig-A does not match the locally generated signature, the storage request 504 may be rejected or ignored.

Upon successful verification of Sig-A, the storage node B 506 may store the received data. In this example, a data structure 514 is utilized that includes a Resource ID field 516 and a second field 518 containing the Data Name, Data Value, and the first string.

Note that the scheme illustrated in FIG. 5 offers various desirable features for implementing data storage authorization and access in a peer-to-peer overlay network.

First, data authorization may allow the storage node B 506 to verify that the data owner (publishing node A 502) is in fact authorized to store at that particular resource ID. In one example, the storage node B 506 may accomplish this by verifying the resource ID received with a locally generated resource ID. Since the storage node B 506 knows or can obtain the first string (e.g., publishing node identifier) and second string, it is able to re-compute a local resource ID to compare to the received resource ID. The second string used by the publishing node A 502 may be known to the storage node B 506. For example, the second string may be a usage type (received in the Storage Request 504) or may be the Data Name. Consequently, the storage node B 506 can use the first string and the second string received in the Storage Request 504 to compute a local version of the resource ID and compare it to the received resource ID. This allows the overlay network to restrict the number of storage locations at which data can be stored by a given node and hence limits the impact of a single node to the distributed quota available in the overlay.

In a general sense, resource ID verification may be based on providing an authenticatable proof of the first string (e.g., proof of ownership of the publishing node identifier) and then verify that a well known (or agreed upon) function of the first string and the second string (e.g., usage type) maps to the storage's ID space. The authenticatable proof of the first string may be based, for example, on an asymmetric key operation (e.g., use of a public/private key pair). There are a few potentially independent ways of achieving verification resource identifier. A first way may be to expect the storage nodes that accept a service publication storage request to know that a particular type of service/usage (i.e., second string) is authorized. That is, the services/usages may be pre-defined and well known nodes of the overlay network. A second way may be to expect all combinations of "second strings" to be accepted by storage nodes. A third way may be to have the second string independently signed by an authority recognized by all nodes.

However, the ability to spread data from the publishing node A 502 around different storage nodes of the overlay network is also desirable. Without the ability to spread data storage among a plurality of storage nodes, a given storage node may be burdened by all the data from a heavy publishing node. By utilizing the scheme in FIG. 5 where the Resource ID is based at least partially on a second string, different data from publishing node A 502 may have a different second string, thereby resulting in different Resource IDs. That is, the second string may change for different types of data or usages or may be arbitrary each time. Consequently, different Resource IDs may be generated which map to, and spread the data among, different storage nodes.

Second, data authorization allows the data owner to control which nodes are allowed to write to that particular resource ID. That is, the storage node B 506 may authenticate the storage request 504 to verify that only an authorized node can make such request. For example, in FIG. 5 only a publishing node must have the correct certificate Cert-A to be able to generate the correct signature Sig-A. The storage node B 506 is able to verify that the correct signature has been used (by using the Certification Entity 508). Without this, any node may potentially overwrite the contents of a given resource ID.

The data authorization properties may be usage independent. That is, data authorization for overlay storage may be provided in a usage agnostic fashion. Hence, a storage node in the overlay network is able to verify authorization of a storage request from another node, without having to support the specific usage/service/application to which the data to be stored belongs. That is, whether or not a storage node supports a particular type of service or application, it is able to implement authorization verification of any type of data being stored.

As illustrated in FIG. 5, data authorization may allow the data owner (e.g., Publishing Node A 502) to ensure that unauthorized nodes cannot write to or modify the contents of the particular items (e.g., Data Value) in the resource ID that it stored in the storage node B 506. The assurance of this data authorization feature may depend on the cooperation of the storage node (e.g., storage node B 506) enforcing such data authorization feature.

An authorized storage request may be independently verifiable by any node in the overlay network. In other words, a node retrieving the contents (e.g., Data Name, Data Value) of a resource ID may be able to verify that the data owner (e.g., Publishing Node A) was authorized to store at that resource ID.

As illustrated in FIG. 5, a given publishing node (e.g., Node A 502) may be able to store information or data at multiple node locations in the overlay network. This allows a node to spread its data across a plurality of storage nodes in an overlay network and not rely on a single node, thereby achieving load balancing when different usages are being stored. Overlay storage primitives natively offering such data storage spreading are inherently useful in handling queries and the storage itself.

Data authorization at the overlay level must or may be based on overlay level credentials (e.g., a certificate Cert-A provided by the Certification Entity 508 or a self-signed certificate) are honored by the overlay network. Usage specific certificates cannot be honored by nodes that do not support those usages and hence, are not a viable candidate for overlay level data authorization.

This top level authorization scheme, where both a string and authenticator name are used to generate the Resource ID, has facilitating storage authorization at the overlay level. By utilizing a string (e.g., a usage-specific string) to generate the Resource ID, this causes different data from a particular node to be distributed or spread among storage nodes, thereby achieving a load balancing function.

Example—Lower Level Data Authorization Scheme

The overlay network may provide the ability for a searching node to look up a service (e.g., stored data associated with a usage, service, or application) without having prior knowledge of the node ID (or user name) of the entity offering the service. For example, a node looking for Traversal Using Relay NAT (TURN) services cannot be realistically expected to know the corresponding user names or node IDs.

The resource ID computation may be performed in a usage agnostic fashion such that a resource ID can be utilized to identify any type of usage, service, and/or application. In some instances, usages may be allowed to provide usage-specific inputs into the resource ID computation. That is, the resource ID may be computed based on (at least partially) information provided by a usage (e.g., each specific type of function, service, and/or application).

In order to facilitate some of these features, a modified approach may be used in generating the resource ID. In this modified approach, the resource ID may be based on just the "second" string and not the "first" string (e.g., publishing node ID). However, data authorization may still be performed by associating the "first" string (e.g., publishing node ID) with the resource ID at the storage node data structure. For instance, such authorization may be performed at a usage level of a protocol hierarchy rather than an overlay level.

Figure 6:
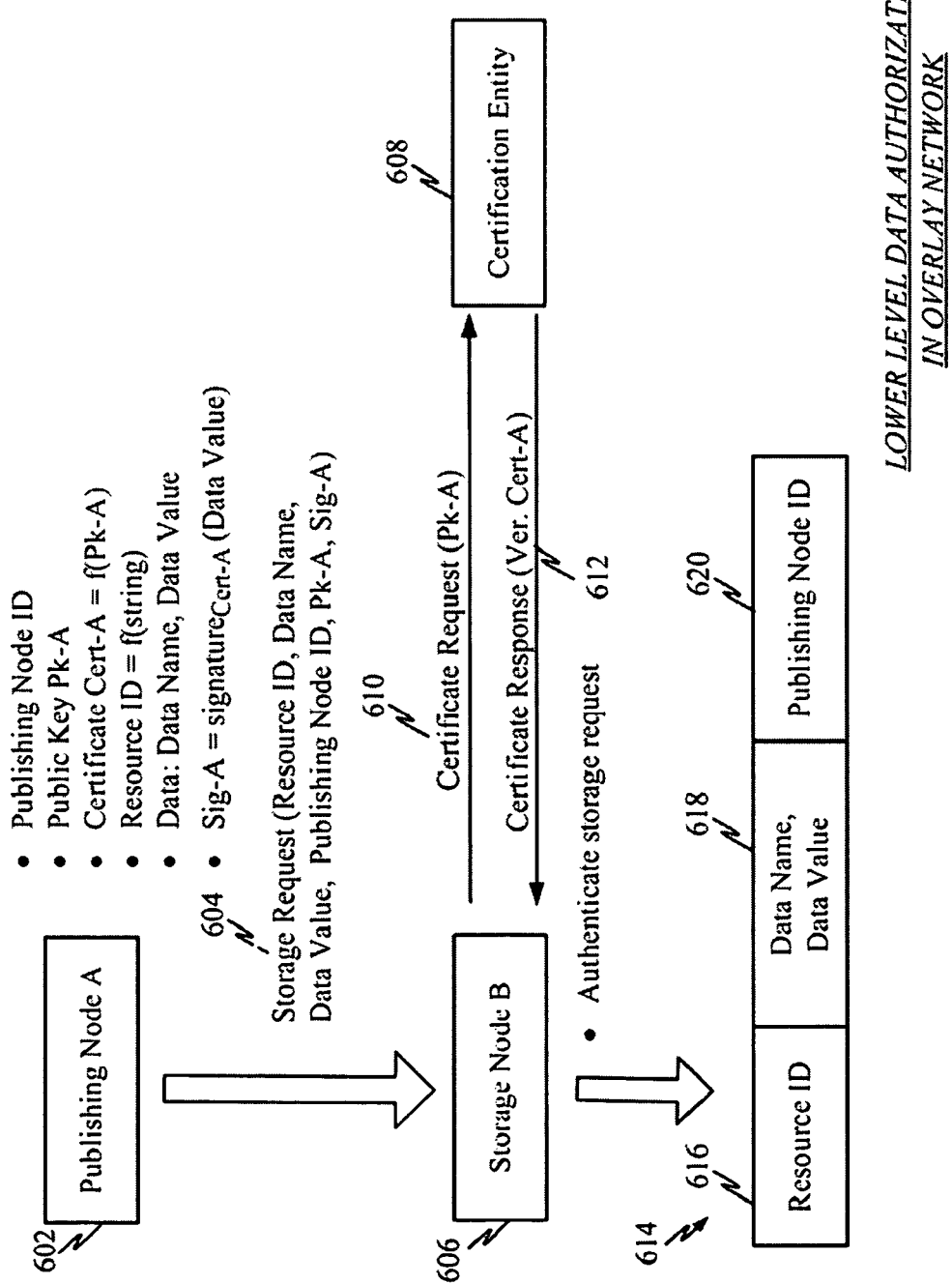
FIG. 6 is a block diagram illustrating an alternative example of how distributive data storage and authorization may be performed in a peer-to-peer overlay network.

FIG. 6 is a block diagram illustrating an alternative example of how distributive data storage and authorization may be performed in a peer-to-peer overlay network. A publishing node A 602 may seek to store data (i.e., Data Value) which may be identified by a Data Name in an overlay network. The publishing node A 602 may have a Publishing Node ID and a Public Key Pk-A (with a corresponding Private Key Prv-A). A Certificate Cert-A may be obtained by the publishing Node A 602 from a certification entity 608, where the Certificate Cert-A is a function of its Public Key Pk-A.

When the publishing node A 602 wishes to store the data in the overlay network, it may generate an associated Resource ID as a function of a string. The "string" may be a predetermined string (e.g., describing the data, usage, or data type). In various examples, the string may be an alpha, alpha-numeric, and/or numeric sequence of symbols. The string may also be a hierarchical structure or may be a concatenation of string components. The publishing node A 502 may also generate a signature Sig-A as a function of Cert-A and the data to be stored (e.g., by signing Data Value with Cert-A).

A storage request 604 may then be generated and sent by the publishing node A 602. The storage request 604 may include the Resource ID, Data Name, Data Value, Publishing Node ID, public key Pk-A, and signature Sig-A.

In this example, the Resource ID may map to a resource space for which node B 606 is responsible. Upon receipt of the storage request 604, storage node B 606 may authenticate the requesting node to determine whether it is in fact the publishing node A 602. This may be accomplished by verifying that the correct certificate Cert-A is known to the requesting node and is associated with the Publishing Node ID. Upon successful verification of the certificate (e.g., by verifying the signature Sig-A), the storage node B 606 may store the received data. In this example, a data structure 614 is utilized that includes a Resource ID field 616, a second field 618 containing the Data Name and Data Value, and a third field 620 containing the Publishing Node ID.

In this example of FIG. 6, the only the "string" is being used to generate the resource ID. The "string" used may be associated with a data type or usage on the overlay network.

Consequently, any node in the overlay network can search for and/or find stored data for such usage by generating the resource ID (e.g., by using the desired string) and searching for stored instances having the same resource ID in the overlay network.

Note that the storage node B 606 maintains the Publishing Node ID 620 separate or private from the Resource ID 616 and Data 618. Therefore, while the storage node B 606 may provide access to the Data 618 to searching nodes that request Resource ID 616, it may also prevent those nodes from deleting or modifying the data 618 unless they can prove they know the associated Publishing Node ID and/or authenticated certificate Cert-A.

This lower level authorization scheme, where the authenticator name AuthName is not part of the Resource ID but is instead appended to the Data portion, has the advantage of allowing multiple nodes to store data under the same Resource ID. This, in turn, makes it easier for searching nodes to find this stored data in an overlay network, thereby facilitating various types of services. Additionally, by utilizing a usage-specific string to generate the Resource ID, this causes different data from a particular node to be distributed or spread among storage nodes, thereby achieving a load balancing function. However, in exchange for the flexibility of allowing other nodes to readily search for particular types of data associated with a particular usage, data access, storage, and/or removal authorization is performed at a lower level (e.g., data level) rather than the overlay level.

Example—Sharing of Resource IDs with Data Authorization Scheme

In the example illustrated in FIG. 6, since a resource ID may be based on a predefined "string" that is representative of a usage, it is probable that different nodes may generate the same resource ID to store different data. Since resource IDs map to a particular ID space and such ID space is allocated among the overlay network nodes, the same node may act as the storage node for a plurality of instances of the same resource ID.

Figure 7:
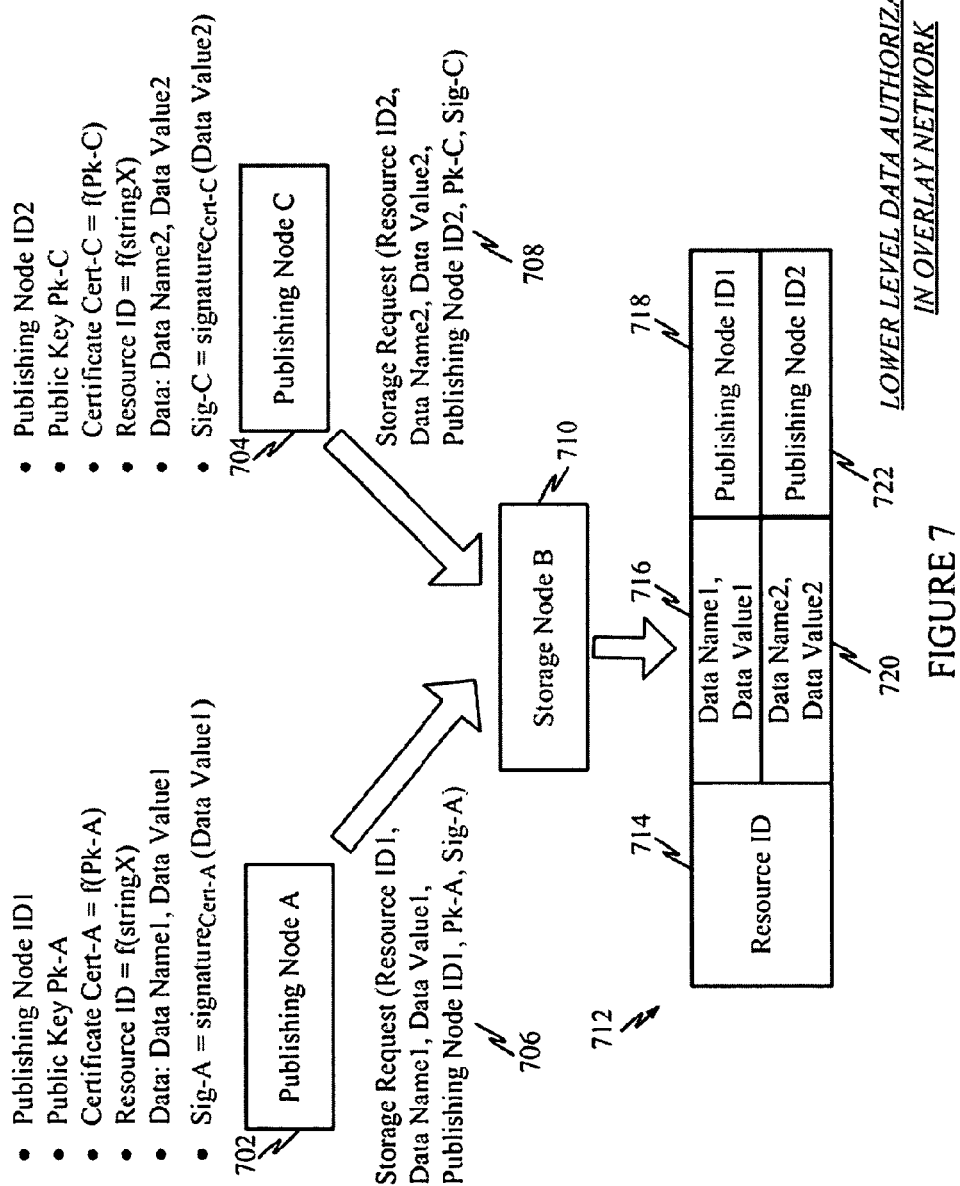
FIG. 7 is a block diagram illustrating an example of how two different publishing nodes may seek to store data using the same resource ID in a peer-to-peer overlay network.

FIG. 7 is a block diagram illustrating an example of how two different publishing nodes may seek to store data using the same resource ID in a peer-to-peer overlay network. Like the examples of FIGS. 5 and 6, a first publishing node A 702 may seek to store data (i.e., Data Name1 and Data Value1) in an overlay network. The publishing node A 702 may have a Publishing Node ID1, a Public Key Pk-A (with a corresponding Private Key Prv-A), and a Certificate Cert-A (which may be a function of the Public key Pk-A and is associated with the Publishing Node ID1). When the publishing node A 702 wishes to store the data in the overlay network, it may generate an associated Resource ID as a function of a stringX. The "stringX" may be a predetermined string (e.g., describing a usage or data type). In various examples, the stringX may be an alpha, alpha-numeric, and/or numeric sequence of symbols. The stringX may also be a hierarchical structure or may be a concatenation of string components. The publishing node A 702 may also generate a signature Sig-A as a function of Cert-A and the data to be stored (e.g., by signing Data Value1 with Cert-A). A first storage request 706 may then be generated and sent by the publishing node A 702. The storage request 706 may include the Resource ID, Data Name1, Data Value1, Publishing Node ID1, public key Pk-A, and signature Sig-A.

In a similar way, a second publishing node C 704 may have a Publishing Node ID2, a Public Key Pk-C (with a corresponding Private Key Prv-C), and a Certificate Cert-C (which may be a function of the Public key Pk-C and is associated with the Publishing Node ID2). When the publishing node C 704 wishes to store the data in the overlay network, it may generate an associated Resource ID as a function of a stringX. Note that, because the second publishing node C 704 used the same stringX as the first publishing node A 702, their resource IDs are the same. The publishing node C 704 may also generate a signature Sig-C as a function of Cert-C and the data to be stored (e.g., by signing Data Value1 with Cert-C). A second storage request 708 may then be generated and sent by the publishing node A 702. The second storage request 708 may include the Resource ID, Data Name2, Data Value2, Publishing Node ID2, public key Pk-C, and signature Sig-C.

The storage node B 710 receives both storage requests 706 and 708 and may authenticate the publishing nodes 702 and 704. Once authenticated, the storage node B 710 may store the received data in a data structure 712 that can store the different data 716 and 720 with the same resource ID 714. In this example, each data instance 716 and 720 of the resource ID 714 has an associated publishing node 718 and 722 which indicates the node that owns that data instance. Therefore, while the storage node B 710 may provide access to the data instances 716 and 720 to searching nodes that request Resource ID 714, it may also prevent nodes from deleting or modifying the data 716 and 720 unless they can prove they know the Publishing Node ID1 718 (for data instance 716) and/or the Publishing Node ID2 722 (for data instance 720).

Enhanced Data Authorization

In various implementations, the "string" used to generate a resource ID may be based on a specific usage-defined strings and/or node/user names or identifiers. In one example, a resource ID may be, at least partially, a function of a resource name.

Figure 8:
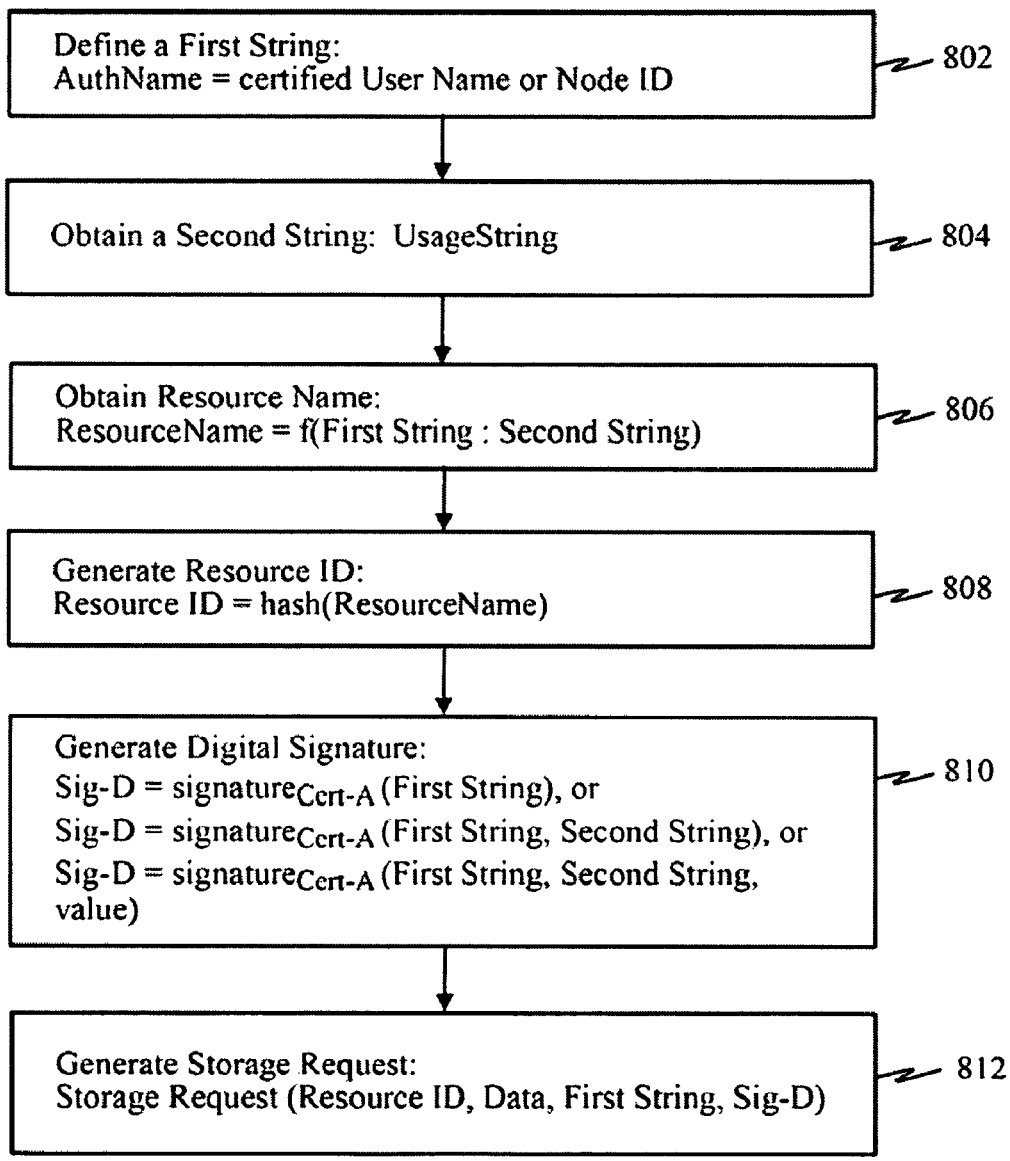
FIG. 8 is a block diagram illustrating an example of how a publishing node may generate a resource ID in an overlay network for overlay level data storage authorization.

FIG. 8 is a block diagram illustrating an example of how a publishing node may generate a resource ID in an overlay network for overlay level data storage authorization. In one example, data authorization may be based on a certified user name or node ID being used to compute a resource name. Essentially, the use of such a mechanism for generating a resource ID allows a storage node to verify that the data owner (i.e., publishing node) is authorized to store at that location. Further, each usage may also be allowed to define its own rules for data authorization. This makes the data authorization model usage dependent, lending itself to the need for homogeneous usage support and usage upgrade flag days for overlay networks.

In one implementation, data authorization can be accomplished in a way that allows independent operation of storage authorization at the overlay level. First, a first string is defined 802, such as a certified user name or node ID for the publishing node. Next, a second string (e.g., usage specific string (UsageString) is obtained 804. In one example, the second string may be provided by a given usage or defaulted to the usage ID.

Optionally, a Resource Name may then be obtained 806, where the Resource Name may include two parts—the first string and the second string. In one example, the two parts may be separated by a delimiter ":" or otherwise combined. A Resource ID is then generated 808 as a hash of the ResourceName, such that ResourceID=hash (ResourceName)=hash (first string: second string). As an example, ResourceID may be hash(alice@example.dht.org:sip), where the first string (e.g., publishing node identifier) is "alice@example.dht.org" and the second string is "sip" (e.g., a usage type). The publishing node may also generate a digital signature Sig-D 810 of the first string, of the first string and second string, or of the first string and second string and another value.

The publishing node can then generate a storage request 812 that includes the Resource ID, the Data to be stored, the first string, and the digital signature Sig-D). Note that other information may also be included as part of the storage request. This storage request may be sent to, or received by, a storage node in the overlay network that is responsible for the ID space for the Resource ID.

Figure 9:
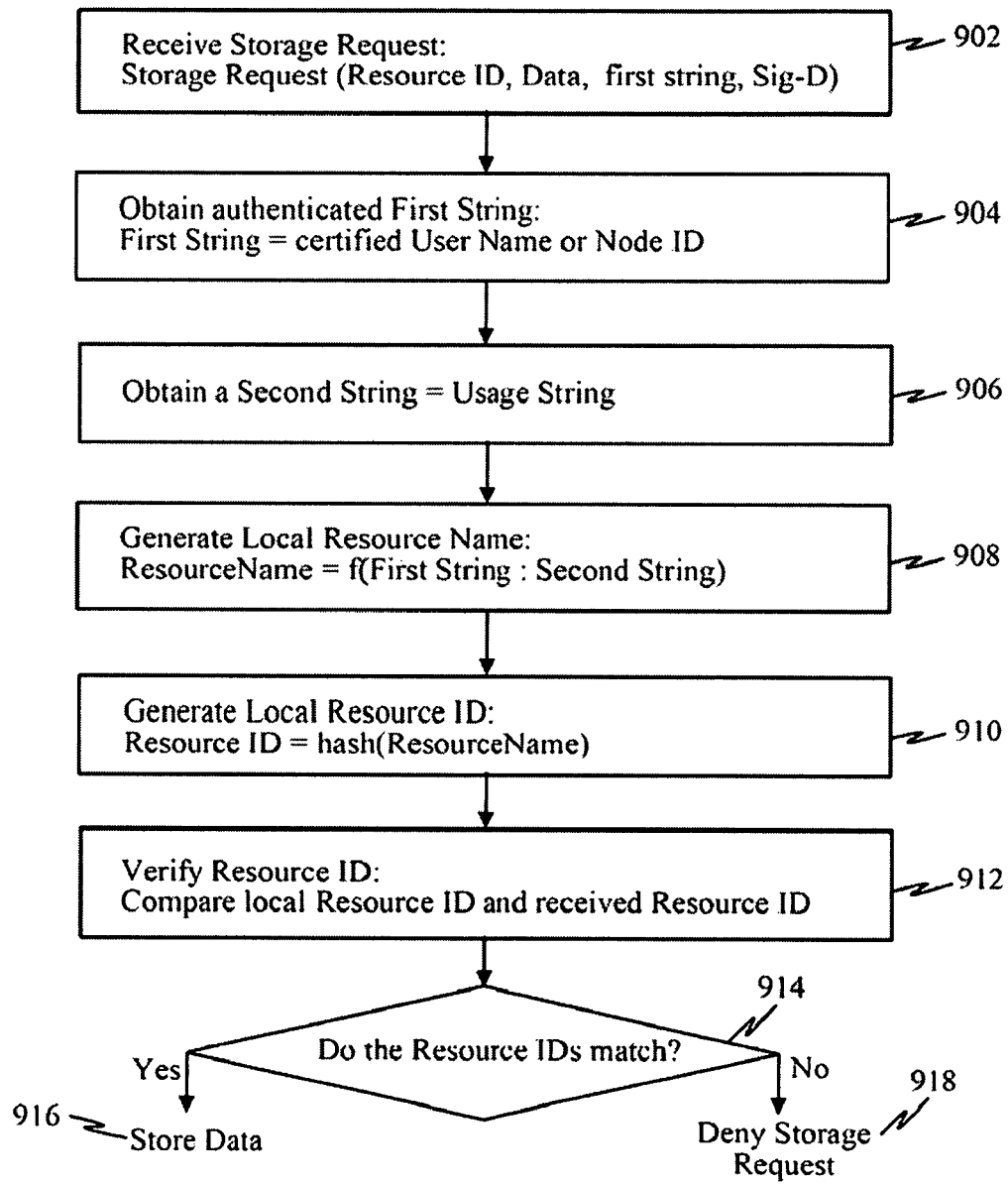
FIG. 9 is a block diagram illustrating an example of how a storage node may verify a resource ID in an overlay network for overlay level data storage authorization.

FIG. 9 is a block diagram illustrating an example of how a storage node may verify a resource ID in an overlay network for overlay level data storage authorization. A storage node may receive a storage request 902 that includes a Resource ID, Data, a first string, and a signature Sig-D. Note that other information may also be included as part of the storage request. The storage request 902 may be generated as illustrated in FIG. 8. To verify that the received Resource ID was validly generated, the receiving storage node can verify the Resource ID by obtaining a first string 902 (which may be received in the storage request) and a second string (e.g., usage-specific string) 906 associated with data being stored. A local instance of the Resource Name 908 is then generated using the obtained first string and second string. A local instance of Resource ID 910 is then generated from a hash of the Resource Name. To verify the received Resource ID 912, the locally-computed instance of the Resource ID is compared 914 to the Resource ID received in the storage request. If they match, the storage request is accepted and the received Data is stored 916, otherwise the storage request is denied 918. Note that, data access authorization using this form of Resource ID generation (which relies on both an AuthName and a UsageString) may be referred as top level authorization since the information needed to authenticate storage of data is included as part of the Resource ID.

In some instances, a usage may be interested in allowing queries or searches for its data without prior knowledge of the user name or node ID. Because, searching nodes may not know the first string (e.g., user name and/or node ID) of the publishing nodes, it is desirable to generate the Resource ID without including the first string as part of the Resource ID or Resource Name.

Figure 10:
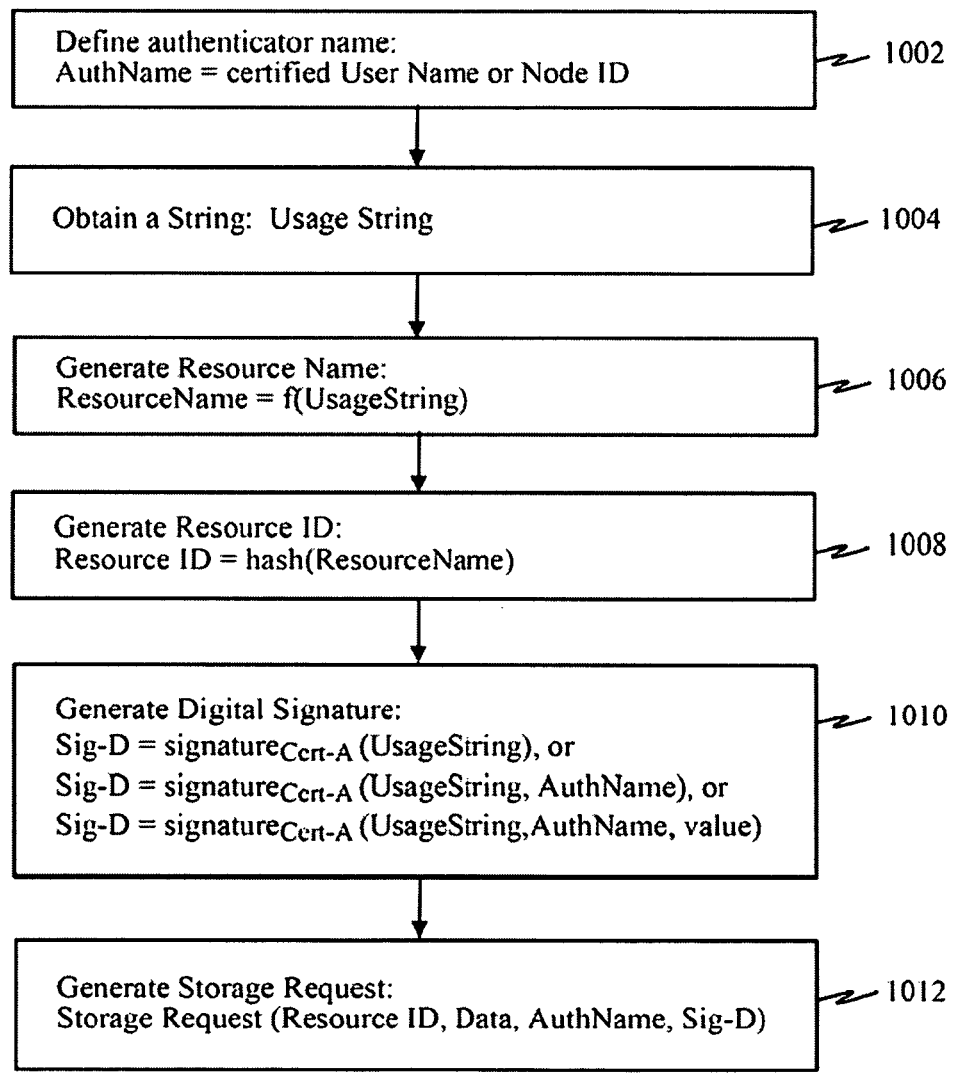
FIG. 10 is a block diagram illustrating an alternative example of how a publishing node may generate a resource ID in an overlay network for usage level data storage authorization.

FIG. 10 is a block diagram illustrating an alternative example of how a publishing node may generate a resource ID in an overlay network for usage level data storage authorization. In this example, data authorization may be provided at a lower level. That is, while the publishing node may define an authenticator name AuthName 1002 and a usage-specific string UsageString 1004, the Resource Name 1006 is generated only as a function of the UsageString. The Resource ID 1008 may then be generated as a function of the Resource Name 1006. In this example, a digital signature Sig-D may be generated by signing the AuthName and/or UsageString and/or another value. The publishing node may then generate a storage request 1012 that includes the Resource ID, the Data to be stored, the authenticator's name AuthName, and the digital signature Sig-D). Note that other information may also be included as part of the storage request. This storage request 1012 may be sent to, or received by, a storage node in the overlay network that is responsible for the ID space for the Resource ID.

Figure 11:
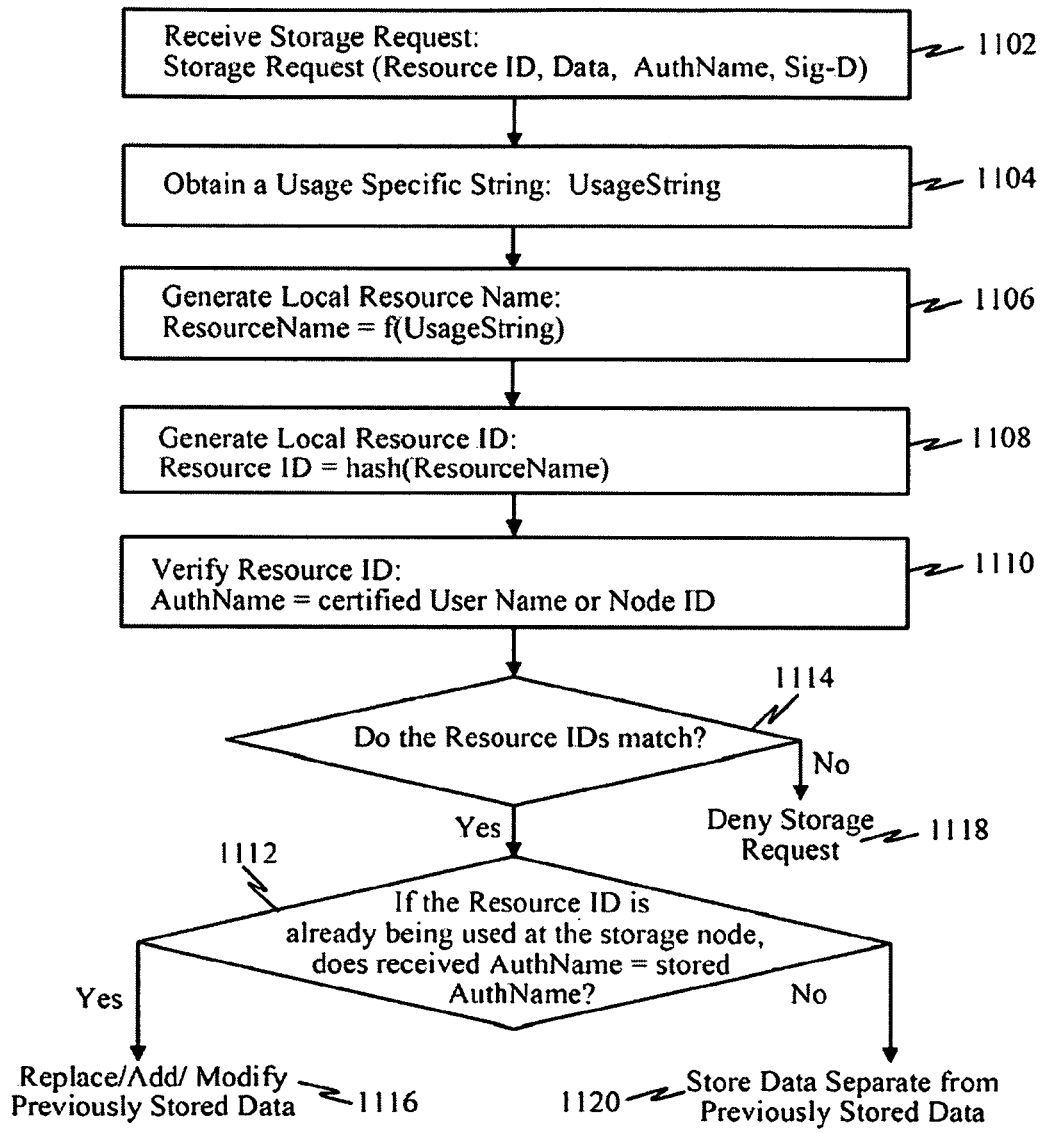
FIG. 11 is a block diagram illustrating an example of how a storage node may verify a resource ID in an overlay network for usage level data storage authorization.

FIG. 11 is a block diagram illustrating an example of how a storage node may verify a resource ID in an overlay network for usage level data storage authorization. A storage node may receive a storage request 1102 that includes a Resource ID, Data, an authenticator name AuthName, and a signature Sig-D. Note that other information may also be included as part of the storage request. The storage request 1102 may be generated as illustrated in FIG. 10. To verify that the received Resource ID was validly generated, the receiving storage node can verify the Resource ID by obtaining a usage-specific string UsageString 1104 associated with the usage of the data being stored. A local instance of the Resource Name 1106 is then generated using the usage string UsageString. A local instance of Resource ID 1108 is then generated from a hash of the Resource Name. To verify the received Resource ID 1110, the locally-computed instance of the Resource ID is compared 1114 to the Resource ID received in the storage request. If they do not match, then the storage request is denied 1118.

In the case where the store request is attempting to overwrite, delete, or modify data currently stored and associated with the same Resource ID, the storage node may further verify the authenticator's name AuthName 1112. That is, the storage node may verify that the received storage request came from a party authorized to replace such data (e.g., a party that know the AuthName or an associated certified certificate). If it is determined that the current storage request came from the same publishing node as the previously stored data under the same Resource ID, then the newly received Data may be stored 1116 such that it replaces or is added to the previously stored Data. Otherwise, if it is determined that the current storage request came from a different publishing node (as the previously stored data under the same Resource ID), then the storage request may be accepted but will not replace, modify, or delete the previously stored Data. Instead, the new Data may be stored 1120 under the same Resource ID but with the different AuthName associated with the storage request (as illustrated in FIG. 7, data structure 712). Note that, data access authorization using this form of Resource ID generation (which relies on UsageString) may be referred as low level (e.g., usage level, data level or value level) authorization since the information needed to authorize storage of data is not included as part of the Resource ID.

With this low level (or value-level) data authorization, data searching in an overlay network may be performed without knowing a user name or node ID thereby facilitating data discovery. In order to support this dual level authorization (i.e., authorization of a usage-based Resource ID at a higher level and an authenticator's name at a lower lever), the protocol (e.g., the storage request or data access request) may allow the ability to signal the appropriate authorization type in use.

Improvements in Storage Semantics in Overlay Networks
Store and Remove Request Processing Some overlay network services may require that a storage node receiving a store/remove request verify that a kind ID (which is part of the request) is known to the storage node and that the corresponding data model is correct. This assumes that the storage node supports the exact same usage associated with the data of the storage request, which may not necessarily be true. To accommodate the data storage authorization techniques described herein (in which a storage node need not support a particular usage), the storage node may ignore the kind ID check in a storage request. A storage node may, based on local policies, provide preference to data corresponding to usages it supports. However, such local decisions may be outside the scope of the overlay protocol itself.

Storing and Retrieval of Related Data

Using the resource ID computation described herein, data corresponding to a given usage and a given user/node may be associated with a particular resource ID and stored at a storage node responsible for such resource ID. Usages may even spread the data storage among a plurality of storage nodes by providing different semantics to the usage specific data in the Resource Name. For instance, instead of using "sip:alice@example.dht.org" as the Resource Name, the publishing node may utilize "sipaor:alice@example.dht.org", etc., as the Resource Name. In this example, the usage specific semantic "sip" is changed to "sipaor". Some overlay networks may allow storing the certificate corresponding to a user name or node ID at the resource IDs corresponding to the hash of the user name and/or node ID. That by itself is useful; however, it is also useful if the certificate can be stored at the same place as the SIP Address of Record (AOR). There are two ways in which this can be accomplished. The SIP usage may specify a certificate kind that also may be stored at the resource ID. Alternately, it can be modeled as a targeted storage of a resource ID and corresponding value at a node that may not own that resource ID. This would allow a node that is storing data corresponding to multiple usages at the same resource ID (either because it chose to not have authorization or because it computed its resource ID as simply a hash of its node identifier or authenticator name) to just store one instance of a certificate even if multiple usages make use of it. However, at this time, it seems reasonable to expect each usage to define all required related data kinds such that those objects can be stored at the same resource ID with relative case.

Example of Publishing Node Adapted to Generate and Send a Storage Request

Figure 12:
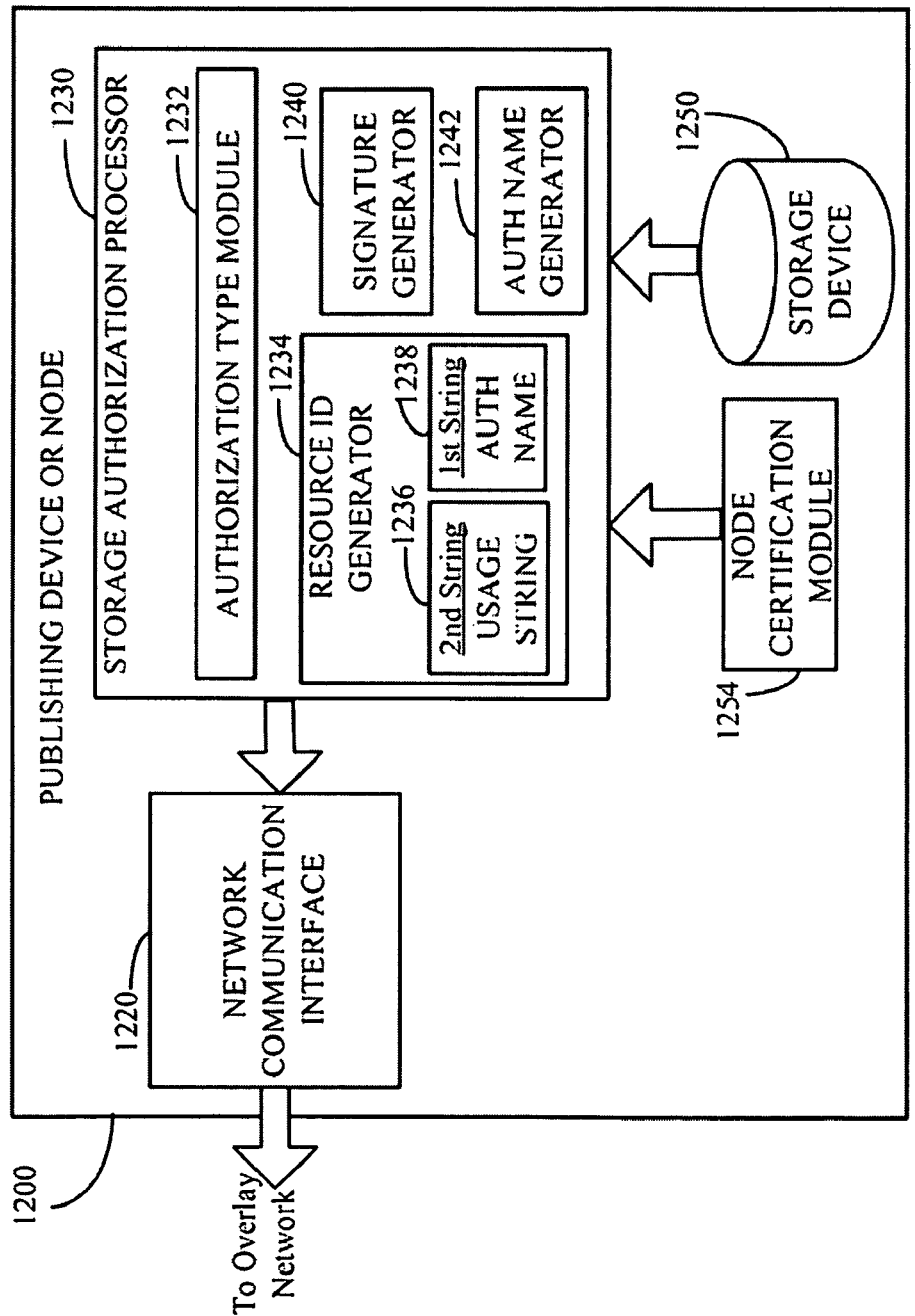
FIG. 12 illustrates an example of a publishing device or node that is adapted to request storage of data in an overlay network.

FIG. 12 illustrates an example of a publishing device or node 1200 that is adapted to request storage of data in an overlay network. The publishing node 1200 may, for example, be a node 104 in overlay network of FIG. 1. The publishing node 1200 may include a Storage Authorization Processor 1230, coupled to a Storage Device 1250 and a Network Communication Interface 1220. In one example, the publishing node 1200 may generate a data storage request that allows independent authorization at the overlay level. In another example, the publishing node 1200 may generate a data storage request that allows independent authorization at the usage level. The publishing node 1200 may wish to store data from the data Storage Device 1250 on the overlay network. A request for data storage may be generated by the Storage Authorization Processor 1230 and sent via the Network Communication Interface 1220 over the overlay network. The Storage Authorization Processor 1230 may include a Resource ID Generator 1234, a Signature Generator 1240, an Authenticator Name Generator 1242, and an Authorization Type Module 1232. In some implementation, the Storage Authorization Processor 1230 may be implemented by one or more processors, processing circuits, and/or modules.

The Authorization Type Module 1232 may determine what type of authorization is appropriate for the particular storage request (or data access request) and selects a procedure for the appropriate type of authorization. For example, a particular usage may call for overlay level authorization (e.g., top level authorization) while other usages may call for usage level authorization (e.g., lower level authorization such as value level or data level authorization).

In the case overlay level authorization is used, the Authorization Type Module 1232 may cause the Resource ID Generator 1234 to generate a resource ID based on a first string 1238 (e.g., publishing node ID or authenticator name) and a second string 1236 (e.g., usage string). The generated resource ID is used to identify the data to be stored with the storage request. The resource ID may also serve to determine which storage node in the overlay network will store the data in the storage request. The Signature Generator 1240 may serve to generate a signature over the first/second strings and/or data to be stored by the storage request; the generated signature may be included as part of the storage request. Additionally, a Node Certification Module 1254 may serve to generate a certificate that uniquely identifies or authenticates the publishing node 1200. In various examples, the Node Certification Module 1254 may generate the certificate by self-authentication or via an external authentication process with a certification entity. Such certificate may serve to secure and, subsequently, authenticate the resource identifier in the storage request.

In the case usage level authorization (e.g., data level or value level authorization) is used, the Authorization Type Module 1232 may cause the Resource ID Generator 1234 to generate a resource ID based on just the second string 1236 (e.g., the usage string) without using the first string 1238 (e.g., publishing node identifier or authenticator name). The generated resource ID is used to identify the data to be stored with the storage request. In this instance, the first string 1238 (e.g., publishing node identifier or authorization name) may be appended as part of the data.

In both of these examples, an authorizing indicia (indicating that the certified publishing node is authorizing the storage request) is sent to the storage node either with the storage request or separately. For example, a public key or a verification of the certificate used in the storage request may be obtained by the storage node.

Figure 13:
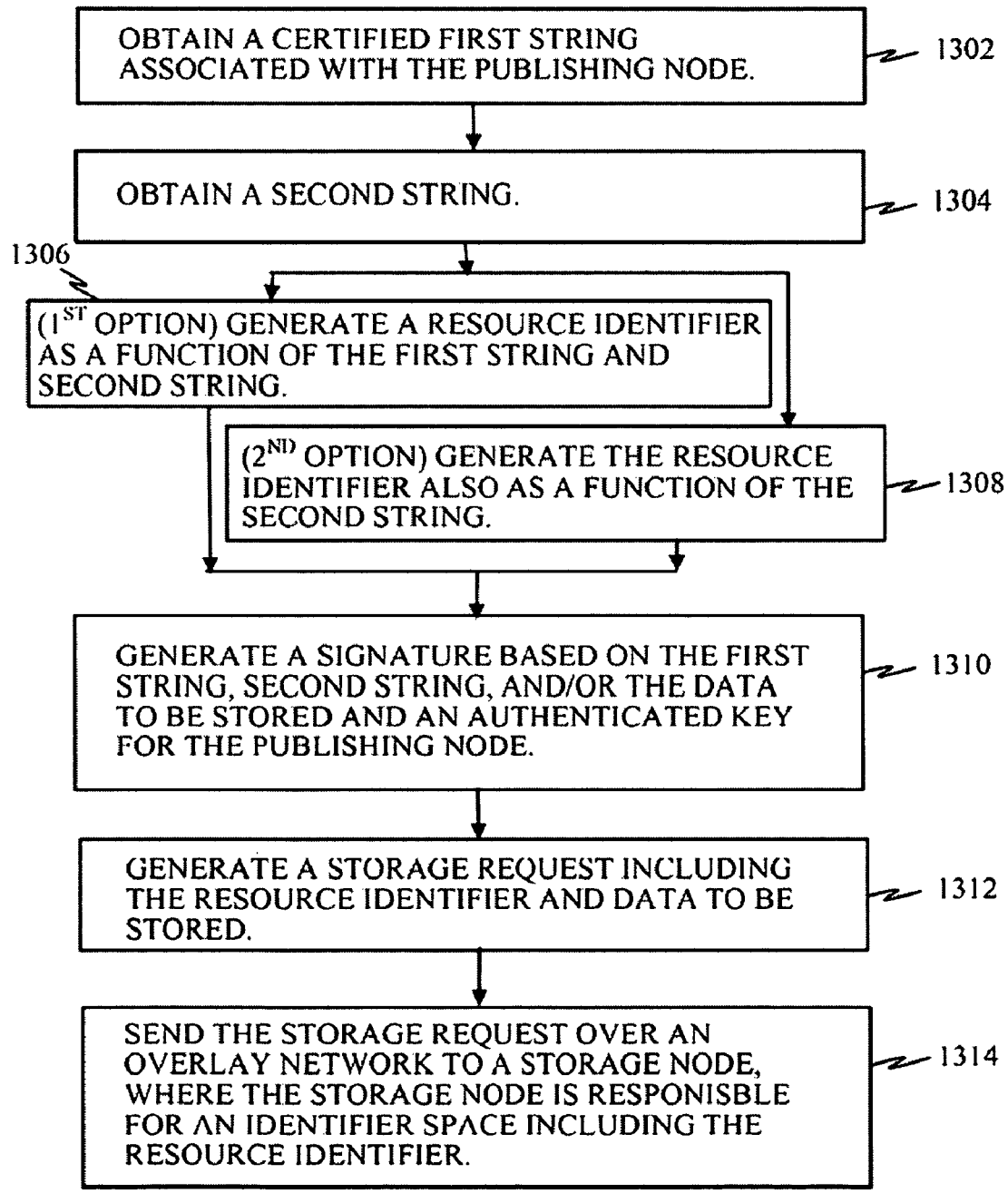
FIG. 13 is a flow diagram illustrating an example of a method operational in a publishing node to facilitate independent storage authorization at the overlay level.

FIG. 13 is a flow diagram illustrating an example of a method operational in a publishing node to facilitate independent storage authorization at the overlay level. In one embodiment, the steps described herein may be carried out by one or more of the modules or devices illustrated in FIG. 12. The publishing node may obtain a certified first string (e.g., node identifier or authenticator name) associated with the publishing node 1302. The publishing node may also obtain a second string 1304 (e.g., arbitrary string or associated with a usage type or data type to be stored). In one example, the second string may be a pre-defined string for a service within the overlay network. If overlay level authorization is implemented, a resource identifier may be generated as a function of the first string and second string 1306, where the first string is independently authenticatable by a storage node and the resource identifier is verifiable by the storage node. Authorization for the storage request may be verifiable at an overlay level of a protocol hierarchy, where the overlay level is below a usage level in the protocol hierarchy. Alternatively, if usage level authorization is implemented, the resource identifier may be generated as a function of the second string 1308. In this case, the storage node may verify the resource identifier at an overlay level, but authorization for the storage request may be verifiable at a usage level of a protocol hierarchy, where the usage level is above an overlay level in the protocol hierarchy. That is, where the resource identifier is a function of only the second string, multiple publishing nodes may generate the same resource identifier for different data to be stored. Consequently, the storage node may verify that the resource identifier was validly generated based on the correct second string (at an overlay level) but can perform storage authorization (to distinguish between data stored by different publishing nodes using the same resource identifier) at a usage level using the first string (which identifies the publishing node) associated with the stored data.

In one example, the function used to generate the resource identifier may be a hash function. The publishing node may also generate a signature based on the first string, second string, and/or the data to be stored which are signed with an authenticated key (e.g., a certificate or private key) for the publishing node 1310. In one example, the authenticated key may be a private key, a self-generated certificate, or a third-party certificate authenticating the publishing node. A storage request may then be generated including he resource identifier and data to be stored 1312. The storage request may also include the first string, second string, and/or the signature. The storage request may then be sent over an overlay network to a storage node, where the storage node is responsible for and identifier space including the resource identifier 1314.

Additionally, the publishing node may generate a plurality of different resource identifiers, where each of the plurality of different resource identifiers is a function of a combination of the first string and different second strings (in the case of overlay level authorization) or just the second strings (in the case of usage level authorization). By using the second string to generate the different resource identifiers, data storage load spreading is achieved within the overlay network where different storage nodes are responsible for different identifier spaces.

Example of Storage Node Adapted to Receive and Authorize a Storage Request

Figure 14:
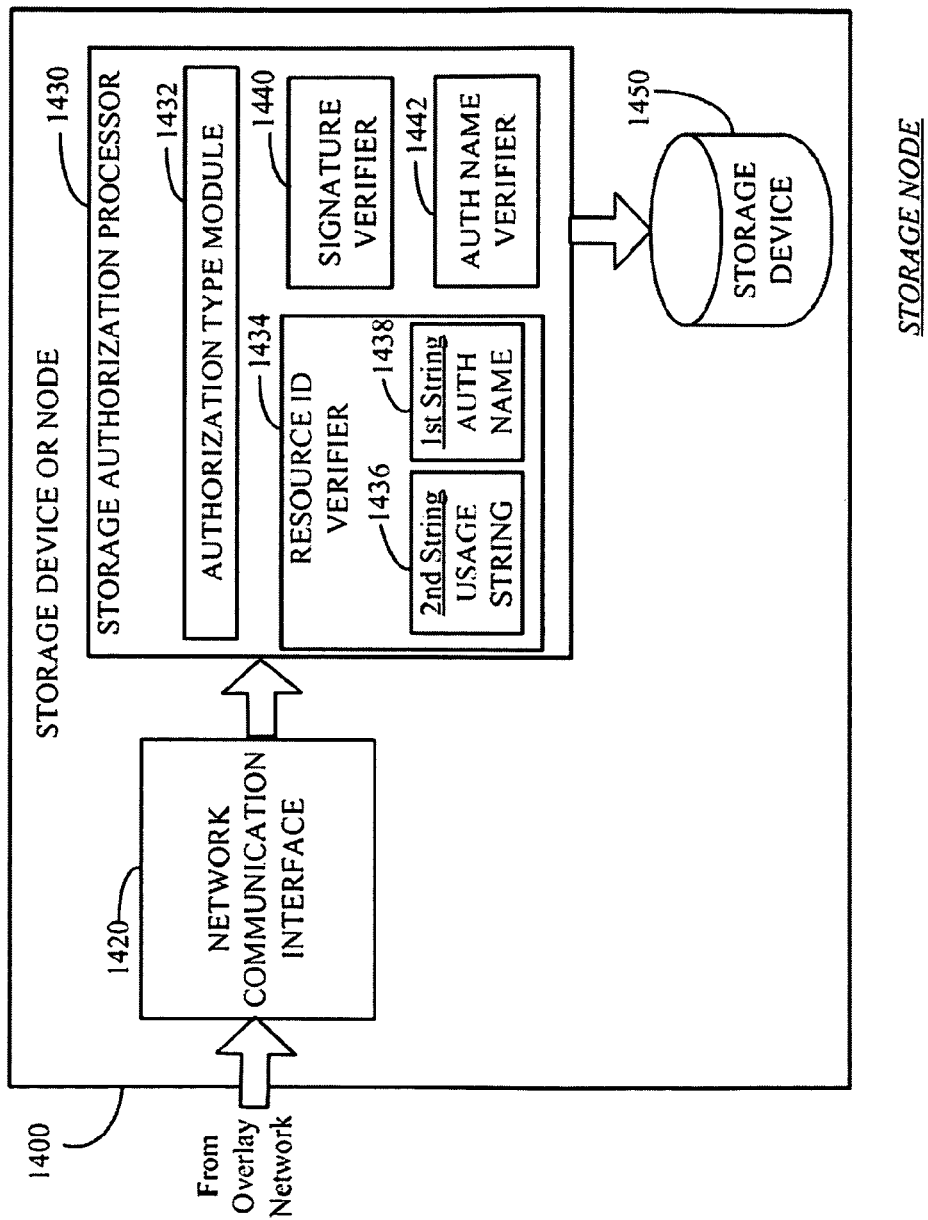
FIG. 14 illustrates an example storage node for storing data in an overlay network while performing data storage authorization.

FIG. 14 illustrates an example storage node for storing data in an overlay network while performing data storage authorization. The storage node 1400 may allow independent authorization of data storage at the overlay level. The storage node 1400 may include a Storage Authorization Processor 1430, a Network Communication Interface 1420, and a Storage Device 1450. A storage request for data storage may be received via the Network Communication Interface 1420 from a publishing node in an overlay network. In one example, the storage request may include a Resource ID, Data, an Authenticator Name, and a Signature. The Network Communication Interface communicates the request to a Storage Authorization Processor 1430 which reviews the request to determine whether the publishing node sending the storage request is authorized to store data at the storage node 1400. Among other things, the Storage Authorization Processor 1430 may include an Authorization Type Module 1432, a Resource ID Verifier 1434, a Signature Verifier 1440, and an Authenticator Name Verifier 1442.

The Authorization Type Module 1432 may determine what type of authorization is appropriate for the particular storage request. For example, the storage request may signal the type of authorization to be utilized for the data being stored. There are at least two types of authorizations that may be used—overlay level authorization and data or value level authorization.

In overlay level authorization, a Resource ID may be associated with, or a function of, a first string (e.g., publishing node identifier, an authenticator name, etc.) and a second string (e.g., arbitrary string, a pre-defined string, etc.). Consequently, the Resource ID Verifier 1434 may utilize the first string 1438 and/or second string 1436 (both of which may be received in the storage request or otherwise provided or indicated to the storage node 1400) to determine whether the request is authorized. In this case, "authorization" means checking that the Resource ID is validly generated and that the first string (e.g., publishing node identifier or authenticator name) is authenticated (e.g., so that the stored data can be uniquely associated with the publishing node).

In usage level authorization (e.g., data or value level authorization), the Resource ID may be associated with, or a function of, a second string 1436 (which may be associated with the usage type or data type to be stored). Consequently, the Resource ID Verifier 1434 may utilize the second string 1436 to determine whether the Resource ID is validly generated. Additionally, for storage authorization at the usage level, the Authenticator Name Verifier 1442 may verify the first string (publishing node identifier or authenticator name) for the storage request. Note that the first string may be utilized to determine whether a storage request having the same Resource ID as previously stored data should replace that previously stored data or whether it should be stored separately.

Similarly, the Signature Verifier 1440 may verify the signature of the storage request.

Figure 15A:
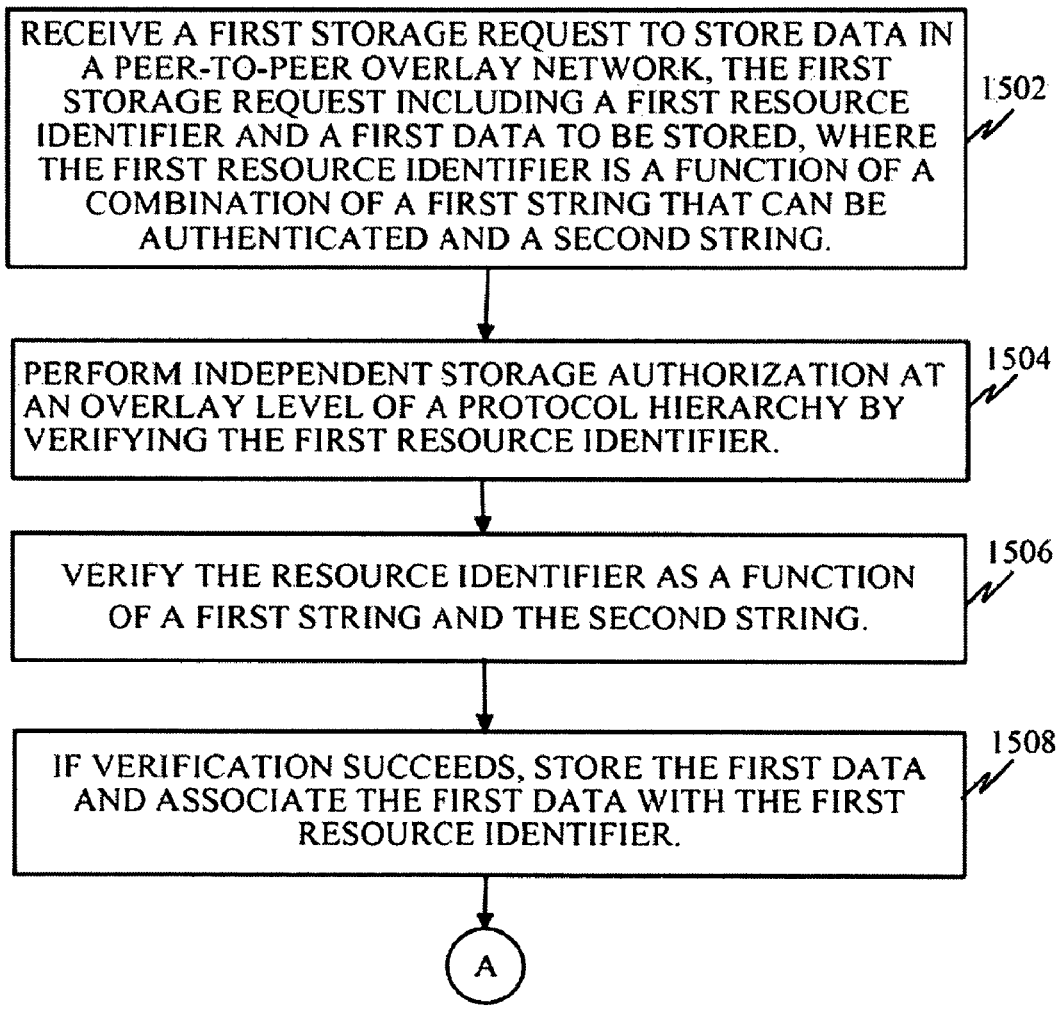
FIG. 15 (comprising FIGS. 15A and 15B) illustrates an example of a method operational in a storage node for performing independent storage authorization at an overlay level.
Figure 15B:
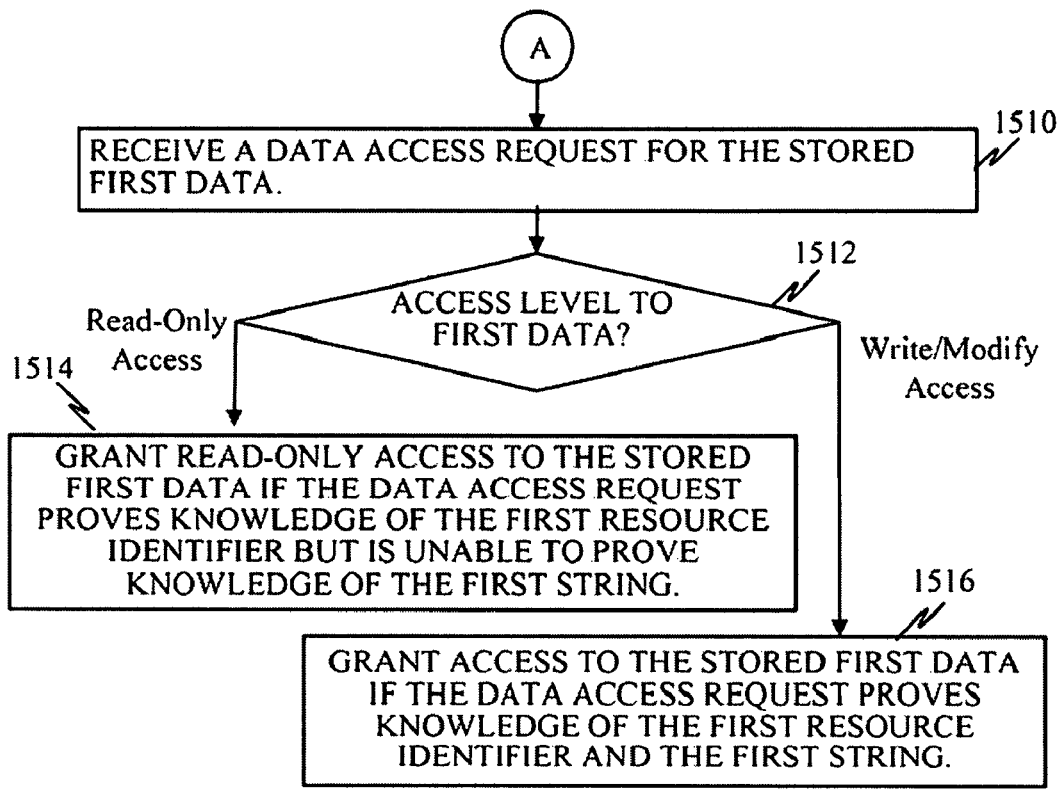

FIG. 15 (comprising FIGS. 15A and 15B) illustrates an example of a method operational in a storage node for performing independent storage authorization at an overlay level. The storage node receives a first storage request to store data in a peer-to-peer overlay network, the first storage request including a first resource identifier and a first data to be stored, where the first resource identifier is a function of a combination of a first string that can be authenticated and a second string 1502. The storage request may include, for instance, a Resource Identifier, data to be stored, the first string (e.g., publishing node identifier, Authenticator Name), the second string, and/or a Signature over the first/second strings and/or data being stored. Depending on the authorization type being used, the Resource Identifier may be a function of the first string and/or the second string. In one example, the first string may be a publishing node identifier and the second string is an arbitrary string. In another example, the first string is a publishing node identifier and the second string is a pre-defined string for a service within the overlay network.

In overlay level authorization, the Resource Identifier is verified as a function of the first string and the second string 1506. That is, the storage node may compute a local version of the Resource Identifier to verify the received Resource Identifier. If the Resource Identifier is successfully verified, the first data is stored and is associated with the first resource identifier 1508. Otherwise, the request is denied. In one example, performing independent storage authorization at the overlay level may include (a) authenticating the first string, and (b) determining whether the first resource identifier is a function of a combination of the first string and the second string.

The storage node may subsequently receive a data access request for the stored first data 1510. An access level to the first data may then be determined 1512. If the data access request proves knowledge of the first resource identifier and the first string, then access to the stored first data may be granted 1516. Such access may include write, modify, and/or delete access to the first data. Granting access to the stored first data may also include permitting replacement of the first data with a second data. If the data access request proves knowledge of the first resource identifier but is unable to prove knowledge of the first string, then read-only access may be granted to the stored first data 1514. Note that if the access request is unable to prove knowledge of either the resource identifier or the first string, then access to the first data may be denied.

Figure 16A:
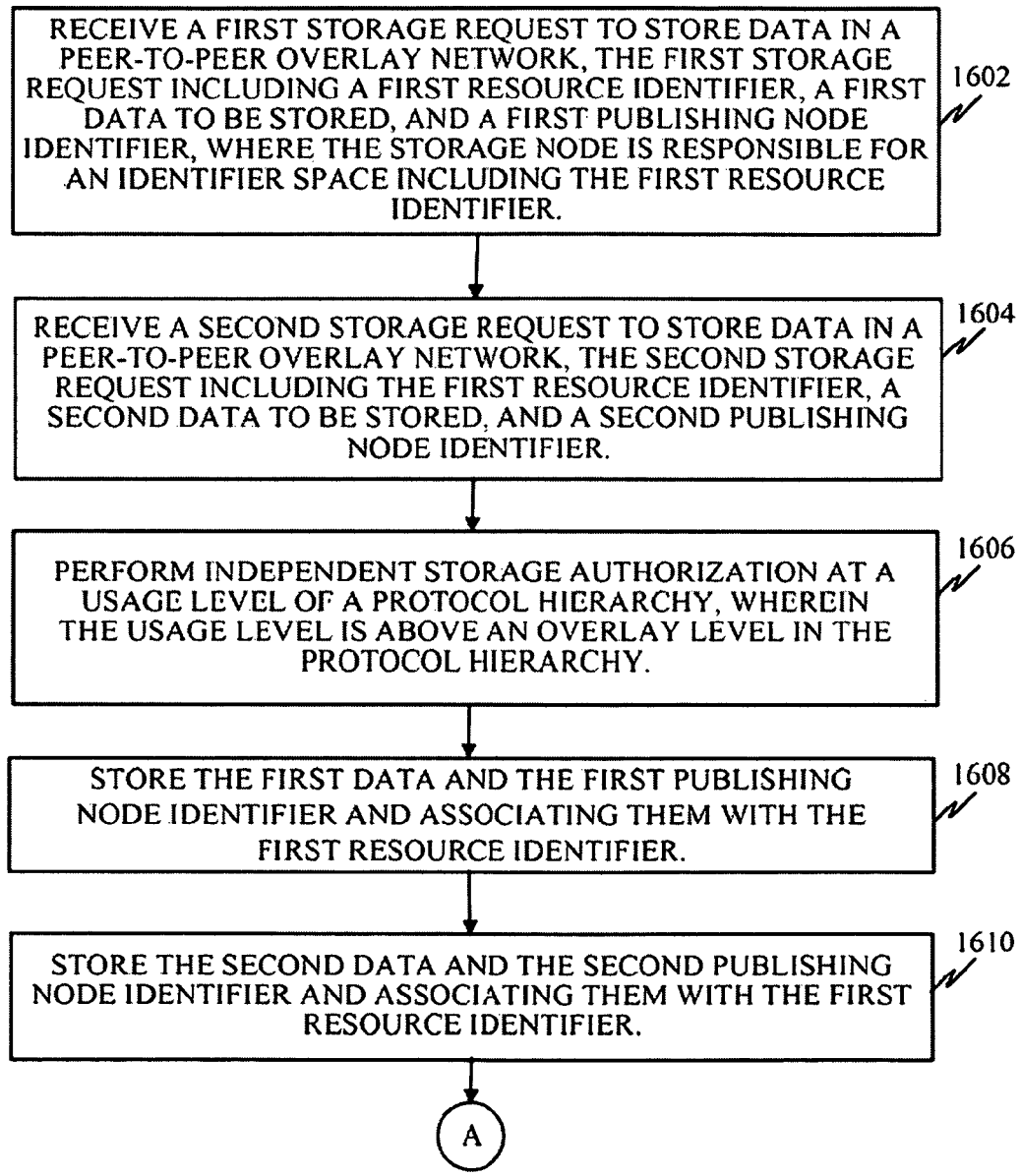
FIG. 16 (comprising FIGS. 16A and 16B) illustrates an example of a method operational in a storage node for performing independent storage authorization at a usage level.
Figure 16B:
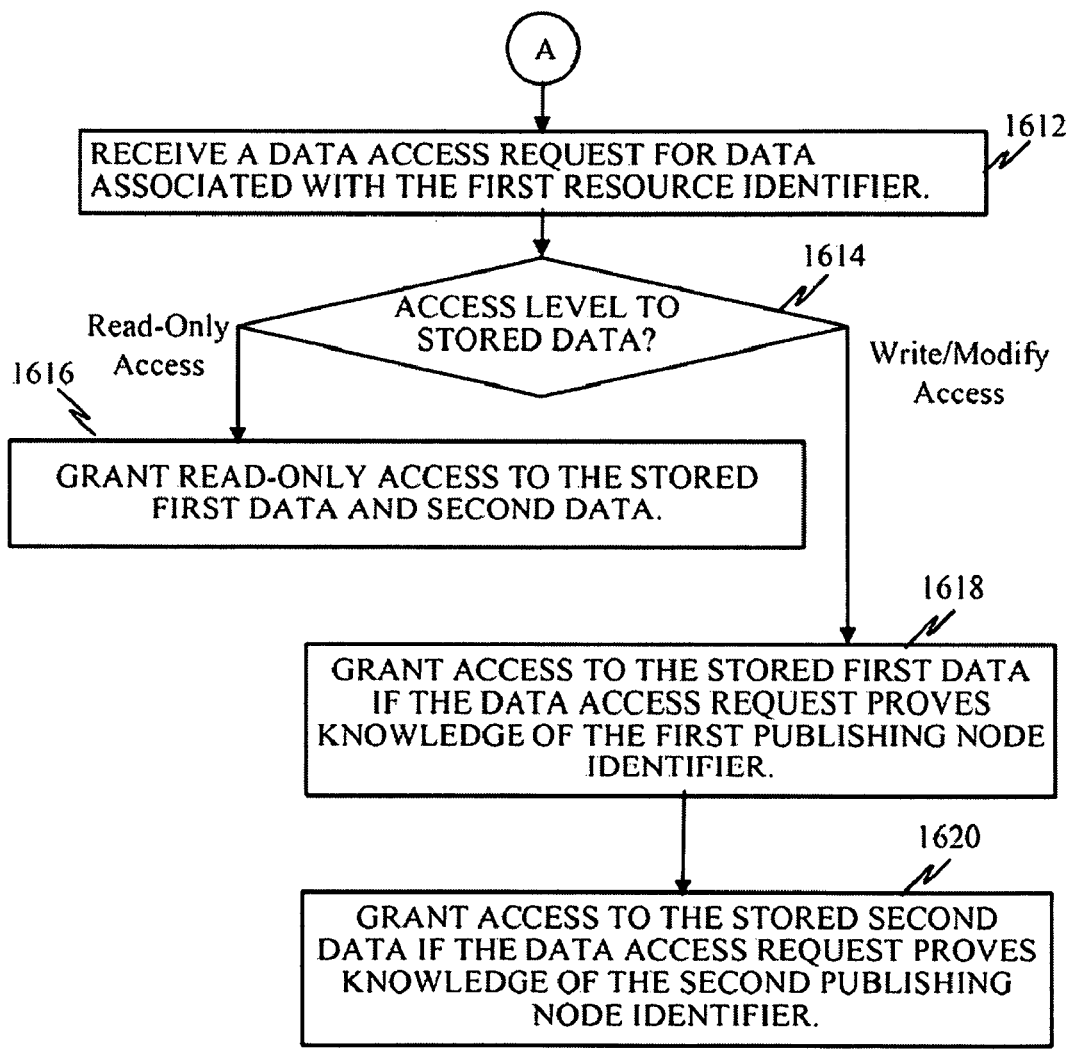

FIG. 16 (comprising FIGS. 16A and 16B) illustrates an example of a method operational in a storage node for performing independent storage authorization at a usage level. The storage node receives a first storage request to store data in a peer-to-peer overlay network, the first storage request including a first resource identifier, a first data to be stored, and a first publishing node identifier, where the storage node is responsible for an identifier space including the first resource identifier 1602. The first resource identifier may be a function of a usage string associated with a type of data to be stored. For instance, the first resource identifier may be a function of a pre-defined string for a service within the overlay network.

Additionally, the storage node may also receive a second storage request to store data in a peer-to-peer overlay network, the second storage request including the first resource identifier, a second data to be stored, and a second publishing node identifier 1604. Independent storage authorization may be performed at a usage level of a protocol hierarchy, wherein the usage level is above an overlay level in the protocol hierarchy 1606. The first data and the first publishing node identifier may be stored and associated with the first resource identifier 1608. The second data and the second publishing node identifier may also be stored and associated with the first resource identifier 1610.

The storage node may subsequently receive a data access request for data associated with the first resource identifier 1612. An access level to the stored data may be determined for the data access request 1614. By default, read-only access may be granted to the stored first data and second data 1616. However, if the data access request proves knowledge of the first publishing node identifier, write access may be granted to the stored first data 1618. Similarly, if the data access request proves knowledge of the second publishing node identifier, write access may be granted to the stored second data 1620.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in the Figures may be rearranged and/or combined into a single component, step, or function or embodied in several components, steps, or functions without affecting the operation of the pseudo-random number generation. Additional elements, components, steps, and/or functions may also be added without departing from the invention. The apparatus, devices, and/or components illustrated in the Figures may be configured to perform one or more of the methods, features, or steps described in the Figures. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed with a moving or static communication device (e.g., access terminal) and a plurality of mobile or static base stations (e.g., access points).

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a publishing node in a peer-to-peer overlay network to store data, comprising:

generating at the publishing node a resource identifier and associating the resource identifier with a first data, wherein the resource identifier is a function of a combination of a first string identifying the publishing node and a second string associated with a usage type for the first data, where the first string is independently authenticatable by a storage node and the resource identifier is verifiable by the storage node;

generating at the publishing node a storage request including the resource identifier and the first data to be stored; and sending the storage request over the overlay network to the storage node, the storage node responsible for an identifier space including the resource identifier, wherein the storage request is authorized by the storage node independent of usages supported by the storage node, and authorization of the storage request is verifiable at an overlay level of a protocol hierarchy, the overlay level being below a usage level in the protocol hierarchy.

2. The method of claim 1, wherein the second string is an arbitrary string.

3. The method of claim 1, wherein the second string is a pre-defined string for a service within the overlay network.

4. The method of claim 1, further comprising:
generating a plurality of different resource identifiers, where each of the plurality of different resource identifiers is a function of a combination of the first string and different second strings.

5. The method of claim 4, wherein generating the different resource identifiers causes data storage load spreading within the overlay network where different storage nodes are responsible for different identifier spaces.

6. The method of claim 1, wherein the storage request also includes an indicator of the first string.

7. The method of claim 1, wherein the storage request also includes an indicator of the second string.

8. A publishing node device, comprising:
a communication interface for communicating over a peer-to-peer overlay network;
a computer processor coupled to the communication interface, wherein the processor is adapted to:
generate a resource identifier and associate the resource identifier with a first data, wherein the resource identifier is a function of a combination of a first string identifying the publishing node and a second string associated with a usage type for the first data, where the first string is independently authenticatable by a storage node and the resource identifier is verifiable by the storage node;
generate a storage request including the resource identifier and the first data to be stored; and
send the storage request over the overlay network to the storage node, the storage node responsible for an identifier space including the resource identifier, wherein the storage request is authorized by the storage node independent of usages supported by the storage node, and authorization of the storage request is verifiable at an overlay level of a protocol hierarchy, the overlay level being below a usage level in the protocol hierarchy.

9. The publishing node device of claim 8, wherein the second string is an arbitrary string.

10. The publishing node device of claim 8, wherein the second string is a pre-defined string for a service within the overlay network.

11. The publishing node device of claim 9, wherein the processor is further adapted to:
generate a plurality of different resource identifiers, where each of the plurality of different resource identifiers is a function of a combination of the first string and different second strings.

12. The publishing node device of claim 11, wherein generating the different resource identifiers causes data storage load spreading within the overlay network where different storage nodes are responsible for different identifier spaces.

13. A publishing node device, comprising:
means for generating at the publishing node a resource identifier and associating the resource identifier with a first data, wherein the resource identifier is a function of a combination of a first string identifying the publishing node and a second string associated with a usage type for the first data, where the first string is independently authenticatable by a storage node and the resource identifier is verifiable by the storage node;
means for generating a storage request including the resource identifier and the first data to be stored; and
means for sending the storage request over a peer to peer overlay network to the storage node, the storage node responsible for an identifier space including the resource identifier, wherein the storage request is authorized by the storage node independent of usage types supported by the storage node, and authorization of the storage request is verifiable at an overlay level of a protocol hierarchy, the overlay level being below a usage level in the protocol hierarchy.

14. A method operational on a storage node, comprising:
receiving at the storage node a first storage request to store data of a publishing node in a peer-to-peer overlay network, the first storage request including a first resource identifier and an associated first data to be stored, where the first resource identifier is a function of a combination of an authenticatable first string identifying the publishing node and a second string associated with a usage type for the first data;
performing at the storage node independent storage authorization at an overlay level of a protocol hierarchy by verifying the first resource identifier, the independent storage authorization performed independent of usages supported by the storage node, wherein the overlay level is below a usage level in the protocol hierarchy; and
storing at the storage node the first data and associating it with the first resource identifier if the first resource identifier is successfully verified.

15. The method of claim 14, wherein performing independent storage authorization at the overlay level includes:
authenticating the first string; and
determining whether the first resource identifier is a function of a combination of the first string and the second string.

16. The method of claim 14, wherein the second string is an arbitrary string.

17. The method of claim 14, wherein the second string is a pre-defined string for a service within the overlay network.

18. The method of claim 14, further comprising:
receiving a data access request for the stored first data; and
granting access to the stored first data if the data access request proves knowledge of the first resource identifier and the first string.

19. The method of claim 18, further comprising:
granting read-only access to the stored first data if the data access request proves knowledge of the first resource identifier but is unable to prove knowledge of the first string.

20. The method of claim 18, wherein granting access to the stored first data includes permitting replacement of the first data with a second data.

21. A storage node device, comprising:
a communication interface for communicating over a peer-to-peer overlay network;
a computer processor coupled to the communication interface, wherein the processor is adapted to:
receive a first storage request to store data of a publishing node in the peer-to-peer overlay network, the first storage request including a first resource identifier and an associated first data to be stored, where the first resource identifier is a function of a combination of an authenticatable first string identifying the publishing node and a second string associated with a usage type for the first data;

perform independent storage authorization at an overlay level of a protocol hierarchy by verifying the first resource identifier, the independent storage authorization performed independent of usages supported by the storage node, wherein the overlay level is below a usage level in the protocol hierarchy; and store the first data and associating it with the first resource identifier if the first resource identifier is successfully verified.

22. The storage node device of claim 21, wherein performing independent storage authorization at the overlay level includes:

authenticating the first string; and determining whether the first resource identifier is a function of a combination of the first string and the second string.

23. The storage node device of claim 21, wherein the processor is further adapted to:

receive a data access request for the stored first data; and grant access to the stored first data if the data access request proves knowledge of the first resource identifier and the first string.

24. The storage node device of claim 23, wherein the processor is further adapted to:

grant read-only access to the stored first data if the data access request proves knowledge of the first resource identifier but is unable to prove knowledge of the first string.

25. A storage node device, comprising:

means for receiving at the storage node a first storage request to store data of a publishing node in a peer-to-peer overlay network, the first storage request including a first resource identifier and an associated first data to be stored, where the first resource identifier is a function of a combination of an authenticatable first string identifying the publishing node and a second string associated with a usage type for the first data;

means for performing independent storage authorization at an overlay level of a protocol hierarchy by verifying the first resource identifier, the independent storage authorization performed independent of usages supported by the storage node, wherein the overlay level is below a usage level in the protocol hierarchy; and means for storing the first data and associating it with the first resource identifier if the first resource identifier is successfully verified.

26. A method operational at a publishing node in a peer-to-peer overlay network to store data, comprising:

generating at the publishing node a resource identifier as a function of a second string, where the resource identifier is verifiable by a storage node, the second string being a predefined string identifying a usage type associated with a first data to be stored at the storage node;

generating at the publishing node a storage request including the resource identifier, the first data to be stored, and a first string that is independently authenticatable by the storage node; and sending the storage request over the overlay network to the storage node, the storage node responsible for an identifier space including the resource identifier, wherein different publishing nodes within the overlay network generate data storage requests having the same resource identifier for different data of the same usage type but different corresponding first strings, the different data storage requests being distinguishable from each other based on usage level authorization using the different corresponding first strings.

27. The method of claim 26, wherein the first string is a publishing node identifier.

28. The method of claim 26, wherein authorization for the storage request is verifiable at a usage level of a protocol hierarchy using the first string, where the usage level is above an overlay level in the protocol hierarchy.

29. A publishing node, comprising:

a communication interface for communicating over a peer-to-peer overlay network; and a computer processor coupled to the communication interface, wherein the processor is adapted to:

generate a resource identifier as a function of a second string, where the resource identifier is verifiable by a storage node, the second string being a predefined string identifying a usage type associated with a first data to be stored at the storage node;

generate a storage request including the resource identifier, the first data to be stored, and a first string that is independently authenticatable by the storage node; and send the storage request over the overlay network to the storage node, the storage node responsible for an identifier space including the resource identifier, wherein different publishing nodes within the overlay network generate data storage requests having the same resource identifier for different data of the same usage type but different corresponding first strings, the different data storage requests being distinguishable from each other based on usage level authorization using the different corresponding first strings.

30. A method operational on a storage node, comprising:

receiving at the storage node a first storage request to store data in a peer-to-peer overlay network, the first storage request including a first resource identifier, a first data to be stored, and a first publishing node identifier, where the first resource identifier is based on a usage type associated with the first data and the storage node is responsible for an identifier space including the first resource identifier;

receiving at the storage node a second storage request to store data in the peer-to-peer overlay network, the second storage request including the same first resource identifier, a second data to be stored, and a second publishing node identifier, where the first resource identifier is based on the same usage type associated with the second data;

storing at the storage node the first data and the first publishing node identifier and associating them with the first resource identifier; and storing at the storage node the second data and the second publishing node identifier and associating them with the first resource identifier;

wherein the first and second data are accessible by using the same first resource identifier while each access is independently authenticatable based on the corresponding first and second publishing node identifiers.

31. The method of claim 30, wherein the first resource identifier is a function of a usage string associated with a type of data to be stored.

32. The method of claim 30, wherein the first resource identifier is a function of a pre-defined string for a service within the overlay network.

33. The method of claim 30, further comprising:
performing independent storage authorization using the first resource identifier and a corresponding publishing node identifier at a usage level of a protocol hierarchy, wherein the usage level is above an overlay level in the protocol hierarchy.

34. The method of claim 30, further comprising
receiving a data access request for data associated with the first resource identifier; and
granting read-only access to the stored first data and second data.

35. The method of claim 34, further comprising:
granting write access to the stored first data if the data access request proves knowledge of the first publishing node identifier; and
granting write access to the stored second data if the data access request proves knowledge of the second publishing node identifier.

36. A storage node device, comprising:
a communication interface for communicating over a peer-to-peer overlay network; and
a computer processor coupled to the communication interface, wherein the processor is adapted to:
  receive a first storage request to store data in the peer-to-peer overlay network, the first storage request including a first resource identifier, a first data to be stored, and a first publishing node identifier, where the first resource identifier is based on a usage type associated with the first data and the storage node is responsible for an identifier space including the first resource identifier;
  receive a second storage request to store data in the peer-to-peer overlay network, the second storage request including the same first resource identifier, a second data to be stored, and a second publishing node identifier, where the first resource identifier is based on the same usage type associated with the second data;
  store the first data and the first publishing node identifier and associating them with the first resource identifier; and
  store the second data and the second publishing node identifier and associating them with the first resource identifier;
  wherein the first and second data are accessible by using the same first resource identifier while each access is independently authenticatable based on the corresponding first and second publishing node identifiers.

37. The method of claim 1, wherein the second string is a predefined string identifying the usage associated with the first data to be stored at the storage node.

38. The publishing node device of claim 13, wherein the second string is a predefined string identifying the usage associated with the first data to be stored at the storage node.

39. The method of claim 14, wherein the second string is a predefined string identifying the usage associated with the first data.

40. The method of claim 27, wherein the first string is appended to the data to be stored at the storage node and the resource identifier is independent of the first string.

41. The method of claim 30, wherein the first resource identifier is independent of the first string.

42. The storage node device of claim 36, wherein the first resource identifier is independent of the first string.

* * * * *